United States Patent [19]
Miura et al.

[11] Patent Number: 5,274,717
[45] Date of Patent: Dec. 28, 1993

[54] PARALLEL IMAGE PROCESSOR FOR PERFORMING LOCAL NEIGHBORING IMAGE PROCESSING

[75] Inventors: Shuuichi Miura; Yoshiki Kobayashi; Tadashi Fukushima; Yoshiyuki Okuyama; Takeshi Katoh; Kotaro Hirasawa; Kazuyoshi Asada, all of Hitachi, Japan

[73] Assignee: Hitachi, Ltd., Chiyoda, Japan

[21] Appl. No.: 963,675

[22] Filed: Oct. 20, 1992

Related U.S. Application Data

[63] Continuation of Ser. No. 845,797, Mar. 9, 1992, abandoned. Continuation of Ser. No. 726,153, Jul. 3, 1991, abandoned, Continuation of Ser. No. 300,705, Jan. 25, 1989, abandoned, Continuation of Ser. No. 824,270, Jan. 30, 1986, abandoned.

[30] Foreign Application Priority Data

Feb. 1, 1985 [JP] Japan .................. 60-16553
Sep. 27, 1985 [JP] Japan ................. 60-214163
Dec. 20, 1985 [JP] Japan ................. 60-285576

[51] Int. Cl.⁵ .............................. G06K 9/36
[52] U.S. Cl. ........................ 382/41; 364/133; 382/27; 382/49
[58] Field of Search .............. 382/41, 27, 49; 364/715.01, 736, 133, 140

[56] References Cited

U.S. PATENT DOCUMENTS

| | | | |
|---|---|---|---|
| 4,167,729 | 9/1979 | Steinberg | 382/41 |
| 4,228,421 | 10/1980 | Asada | 382/41 |
| 4,464,789 | 8/1984 | Sternberg | 382/49 |
| 4,484,349 | 11/1984 | McCubbrey | 382/49 |
| 4,542,527 | 9/1985 | Tsunekawa | 382/27 |
| 4,550,437 | 10/1985 | Kobayashi et al. | 382/41 |
| 4,635,242 | 1/1987 | Mori et al. | 382/41 |
| 4,665,556 | 5/1987 | Fukushima et al. | 382/41 |
| 4,718,091 | 1/1988 | Kobayashi et al. | 382/49 |

OTHER PUBLICATIONS

Fukushima, "Image Signal Processor Computers Fast Enough for Gray Scale Video", Electronic Design, Oct. 4, 1984, pp. 209-215.

*Primary Examiner*—Joseph Mancuso
*Attorney, Agent, or Firm*—Antonelli, Terry, Stout & Kraus

[57] ABSTRACT

An LSI parallel image processor in which line buffers and data-flow switching circuits each requiring a larger amount of hardware in the prior art are incorporated into an LSI circuit, the image data delayed by the line buffers is output from an image data output port, shift registers each having a variable number of steps for preserving local image regions are intermittently shifted-in in accordance with applied clocks, and the contents of the shift registers are sequentially read out.

10 Claims, 25 Drawing Sheets

PARALLEL IMAGE PROCESSOR FOR PERFORMING LOCAL NEIGHBORING IMAGE PROCESSING

This application is a continuation of application Ser. No. 07/845,797, filed Mar. 9, 1992, now abandoned, which was a continuation of application Ser. No. 07/726,153, filed Jul. 3, 1991, now abandoned, which was a continuation of Ser. No. 07/300,705, filed Jan. 25, 1989, now abandoned, which was a continuation of application Ser. No. 06/824,270, filed Jan. 30, 1986, now abandoned.

BACKGROUND OF THE INVENTION

This invention relates to a processor for parallel image processing which performs local neighboring (Kernel) image processings such as a spacial convolution operation.

The image processing for processing image data is classified into a preprocessing operation, a feature extraction processing operation, judgement processing, etc., and the parallel image processing processor according to this invention is directed mainly to the preprocessing operation.

This preprocessing is desired to be performed by an image processor which is versatile and allows a high speed processing. However, since the image data to be processed is two-dimentionally extended, it is difficult to parallely process all the image data. Therefore, the parallel processing is often performed for the operations among local neighboring image data such as a spacial convolution operation which is intended for noise reduction and edge enhancement. In order to process such local neighboring image data, there has been proposed an LSI circuit of a local parallel type image processor which is disclosed in Japanese Patent Unexamined Publication No. 59-146,366 (corresponding to U.S. application Ser. No. 578,508) and U.S. Pat. No. 4,550,437. This circuit was large-scale integrated using as a main module a parallel operation circuit which operates parts of the local neighboring data in parallel; plural main modules are arranged or one main module is subjected to a time division processing to extend the size of the local image region, thereby performing the parallel processing of local neighboring operations at a high speed and versatilely.

Namely, this processer performs an m×n (m, n: integer) local parallel image processing in such a way that (1) m main modules, each having an arithmetic unit (processor elements, PE's) are arranged and perform the process in one machine cycle or (2) a single main module having n PE's is used in a time division manner and performs the processing in m machine cycles.

In the above prior art, plural main modules are used to perform an image processing, line buffer circuits, are employed, as externally equipped circuits, for supplying in parallel the image data to the respective main modules. Therefore, once the wiring is made, the local image region which permits a parallel processing is disadvantageously fixed. Moreover, additional line buffer circuits must be employed for expanding the local neighboring region. For example, where a 3×3 local parallel operation is performed with an operating frequency of 6 MHz for an image of 256×256 pixels with each pixel data indicated by 8 bits, a 4 K bit high speed memory or shift register operating with a frequency of 6 MHz is required so that the required amount of hardware becomes large.

On the other hand, where the time division processing is carried out for the image processing, the above line buffer circuit is not required. However, the image data must be supplied to the main module by means of a stick scanning method. In order to convert the ordinary raster-scanned image data into the stick-scanned image data, a larger amount of hardware is required than the above line buffer circuit.

SUMMARY OF THE INVENTION

An object of this invention is to provide a parallel image processor which is capable of obviating the above disadvantages of the prior art and of easily expanding the local image region to be subjected to a local neighboring operation with a smaller amount of hardware.

Another object of this invention is to provide a parallel image processor which can be flexibly applied to several local image regions by means of the same hardware construction.

These objects can be attained by an LSI'ed parallel image processor in which line buffers and dataflow switching circuits requiring a larger amount of hardware in the prior art are incorporated into an LSI circuit, the image data delayed by the line buffers is output from an image data output port, shift registers each having a variable number of steps for preserving local image regions are intermittently shifted-in in accordance with applied clock pulses and the contents of the shift registers are sequentially read out.

Namely, in accordance with this invention, the amount of hardware can be reduced since the line buffer circuits are incorporated in a LSI circuit and the delayed image data is output, and the size of the local image region can be easily expanded only by the connection of the LSI circuits. Further, the data-flow switching circuits are also incorporated as peripheral circuits to operate the step-number variable shift registers in a time division manner so that the parallel image processor according to this invention can be freely adapted to various local image regions without altering the external wirings.

The above and other objects and features of this invention will be apparent from the following description taken in conjunction with the accompanying drawings, in which like reference characters refer to like elements in the several views.

DESCRIPTION OF THE PREFERRED EMBODIMENTS

Figure 1:
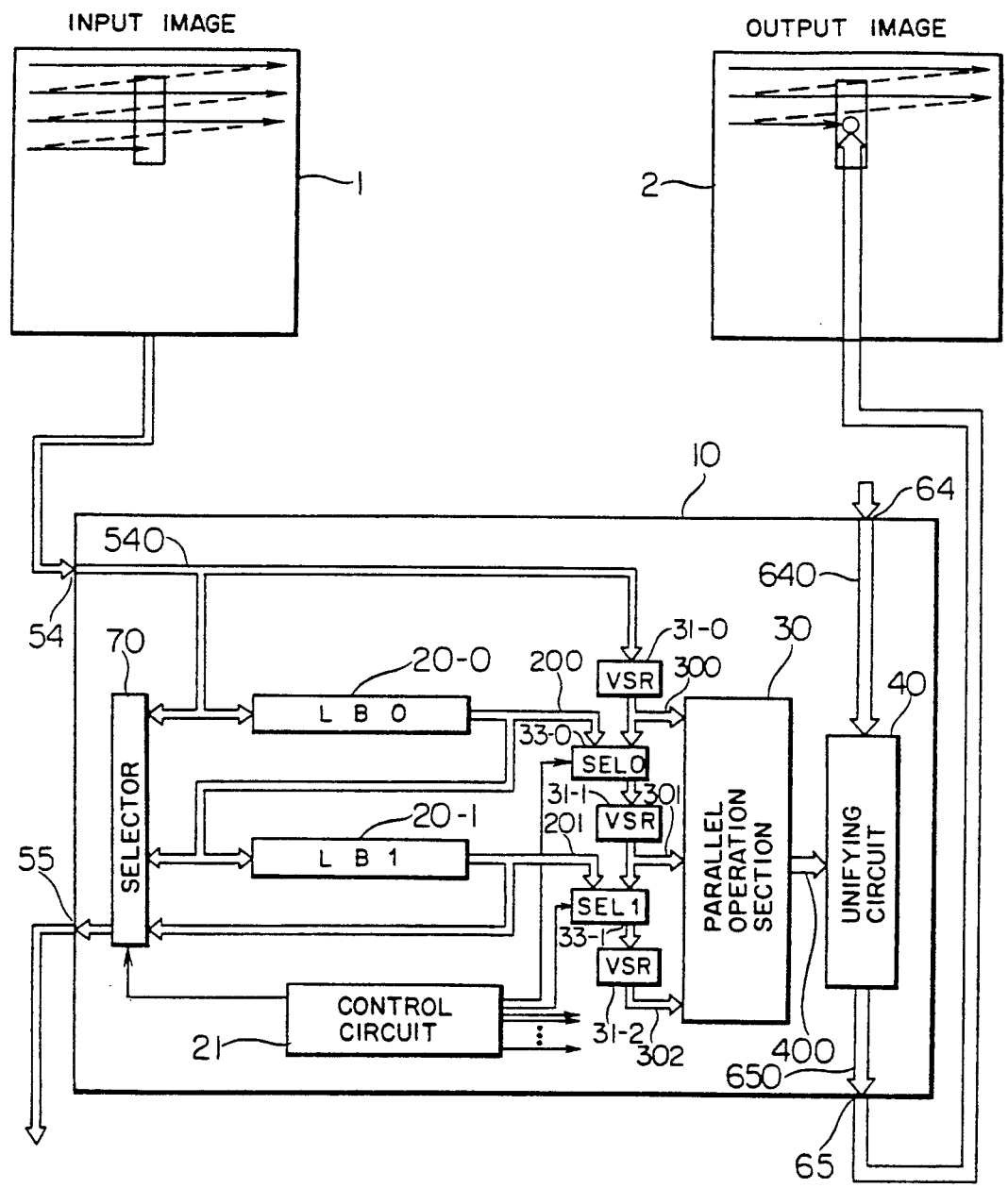
FIG. 1 is a block diagram showing one arrangement of the main module used in the parallel image processor according to one embodiment of this invention.

Several embodiments of this invention will be explained hereinafter referring to the drawings.

Figure 2:
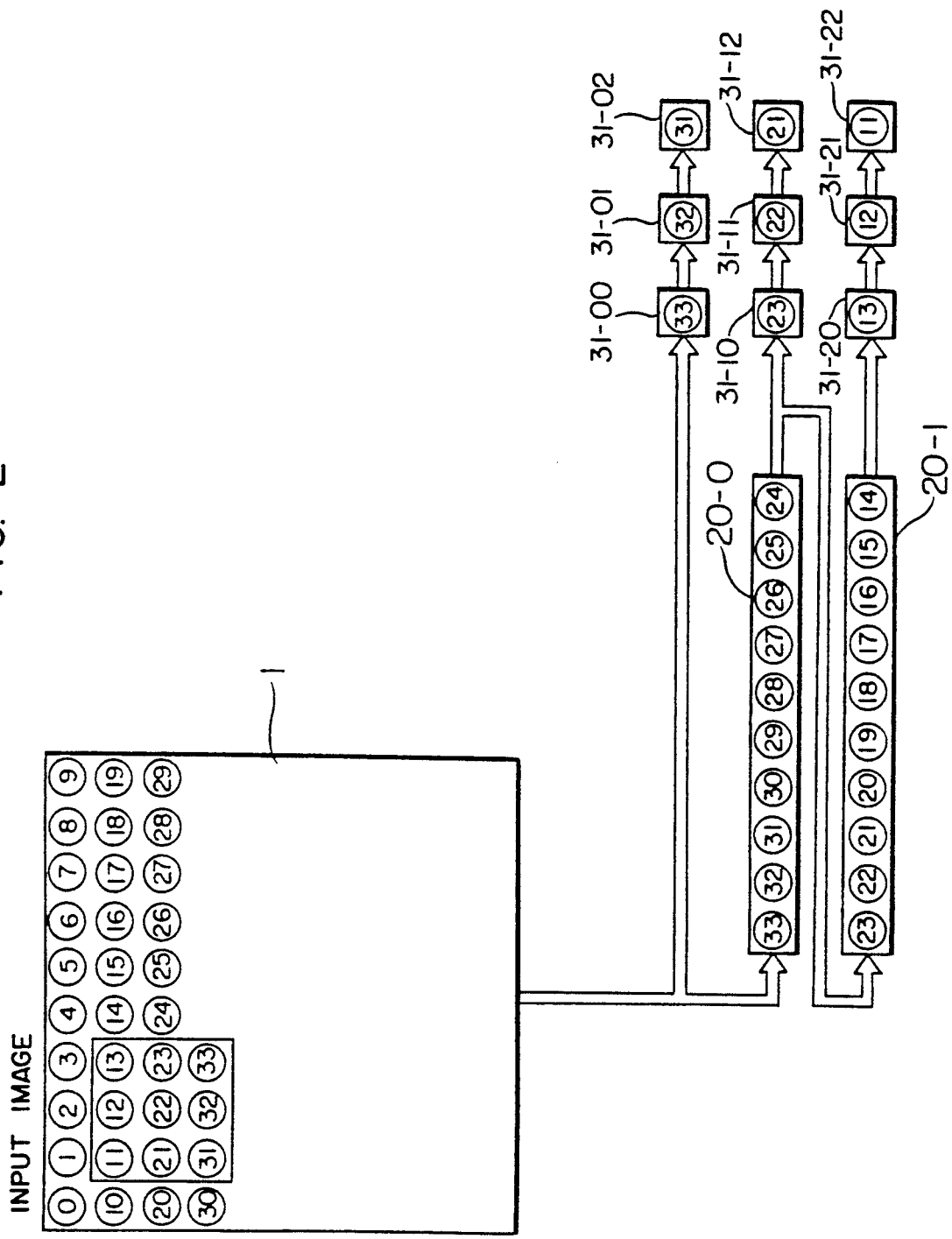
FIG. 2 is a view for explaining a local parallel operation system.

FIG. 2 shows a local parallel operation system for performing a $3 \times 3$ ($m \times n$; m, n: integer) local neighboring image processing, which is a main operation of the image preprocessing operation, at a high speed. It is assumed that an input image 1 to be processed is a gray-scale image consisting of $10 \times 10$ image data, and the image is raster-scanned in the order of ⓪, ①, ②...as shown in FIG. 2. FIG. 2 shows the state where the raster-scanning has been provided through the image data ㉝.

The image data raster-scanned from input image 1 is fed to a register 31-00 and a line buffer 20-0. The image data fed to register 31-00 are shifted to registers 31-01 and 31-02 in order. The image data fed to line buffer 20-0 is delayed by the time required to scan one line of the image data and is then fetched therefrom.

The image data fetched from line buffer 20-0 is fed to a register 31-10 and a line buffer 20-1. The image data fed to register 31-10 is shifted to registers 31-11 and 31-12. The image data fetched to line buffer 20-1 is delayed by the time required to scan one line of the image data and is then fetched therefrom.

The image data fetched from line buffer 20-1 is fed to a register 31-20. The image data fed to register 31-20 is shifted to registers 31-21 and 31-22 in order.

Thus, when the image data ㉝ in register 31-00 and line buffer 20-0, $3 \times 3$ local neighboring image data ⑪, ⑫, ⑬, ㉑, ㉒, ㉓, ㉛, ㉜, and ㉝ with the image data ㉒ centered are simultaneously stored in nine registers 31, respectively. Therefore, by employing the same number of arithmetic units as that of registers 31, the image data in the respective registers 31 can be parallelly operated so that the high speed processing thereof can be realized.

FIG. 1 shows an arrangement of the main module 10 of the parallel image processor according to one embodiment of this invention which is capable of implementing the above local parallel operation. Main module 10 comprises an image data input port 54 from which the image data is input, an image data output port 55 from which the image data delayed inside main module 10 is output, an operation data input port 64 from which the operation result from another main module is input, and an operation result output port 65 from which the internal processing result is output.

The image data raster-scanned from input image 1 is fed to a step-number-variable shift register (VSR) 31-0, line buffer 20-0, and a selector 70 through image data input port 54. Line buffer 20-0 delays the input image data by the time required to scan one line of the image data, and delivers the delayed image data to a selector 33-0, line buffer 20-1, and selector 70. Line buffer 20-1 delays the image data fed from line buffer 20-0 by the time required to scan one more line of the image data and delivers the delayed image data to selectors 33-1 and 70.

Selector 70 selects one of the image data from image data input port 54, the output from image data line buffer 20-0 and the output from line buffer 20-1 in accordance with a control signal from a control circuit 21, and outputs it from image data output port 55. Namely, one of the image data delayed from the input image data by 0, 1 and 2 lines of the data is selected by selector 70 and output from image data output port 55. It should be noted that the output from image data output port 55 is an input image data of a next main module 10 when plural main modules are employed).

VSR 31-0 carries out a shifting operation in accordance with a control signal from control 21 and delivers the image data to a parallel operating section 30 and selector 33-0.

Selector 33-0 selects either one of the outputs from line buffer 20-0 and from VSR 31-0 in accordance with a control signal from, control circuit 21 and delivers it to VSR 31-1, which carries out a shifting operation in the same manner as in VSR 31-0 and supplies the image data to the parallel operating section 30 and selector 33-1.

Selector 33-1 selects either one of the outputs from line buffer 20-1 and from VSR 31-1 in the same manner of control as in selector 33-0 and supplies it to VSR 31-2. VSR 31-2 carries out a shifting operation in the same manner as in VSR 31-0 and supplies the image data to parallel operating section 30. Thus, VSR's 31 can be arranged in one of two manners of $1 \times 3$ and $3 \times 1$ by the switching operation of the selectors 33. The arrangement of VSR's 31 corresponds to that of the local image data which can be simultaneously operated on during one machine cycle.

Parallel operating section 30 parallely operates on the image data from VSR's 31-0, 31-1 and 31-2 and delivers the result of operation to a unifying circuit 40. Unifying circuit 40 unifies the operation data supplied from operation data input port 64 and the output from parallel operating section 30. The unified data is fetched from operation data output port 65 and stored in an output image 2.

The main module 10 in accordance with this embodiment permits three image data simultaneously supplied from three VSR's 31 to be processed in parallel in parallel operating section 30.

On the other hand, the most general local neighboring image operation is an operation of processing 3×3 local neighboring image data as shown in FIG. 2 in which 9 (nine) image data are required to calculate one output image data. Such a 3×3 local neighboring image operation using the main module 10 can be realized by the following two systems of:

(1) time division processing.
(2) provision of more main modules.

The system (1) operates on nine local neighboring image data in such a way that three image data are assigned for each of three machine cycles, and unifies the operation results in unifying circuit 40 in three machine cycles. In this system, the input of the image data and the output of the operation results are performed once during three machine cycles. The main module 10 according to this embodiment permits a time division processing of a maximum of eight machine cycles, and a maximum of 24 image data can be processed in a time division manner using one main module 10.

In the case of an n-times time division processing, line buffer 20 is operated once during n machine cycles, and VSR 31 performs a shift operation once during n machine cycles and preserves 1×n local neighboring image data during n machine cycles. VSR 31 further sends n image data to parallel operating section 30 one by one during the n machine cycles. Parallel operation section 30 performs the arithmetic between the image data supplied in n times and the n coefficients data which are produced corresponding to the image data every one machine cycle and supplies the operation results (data) to unifying circuit 40 every one machine cycle. Unifying circuit 40 unifies the operation data supplied in n times from parallel operation section 30 in n machine cycles and outputs the unified data from operation data output port 65. Thus, this system is slow in its processing speed but requires only one main module and a less amount of hardware.

The system (2) simultaneously operates the 3×3 local neighboring image data during one machine cycle using three main modules 10. In this system, three image data are operated in each main module and the operation data are unified through these three main modules. This system requires a greater amount of hardware than in the system (1) but can perform the operations at a higher speed.

The main module 10 according to this embodiment is also adapted to a multi-mask processing. The multi-mask processing with the number of masks set at m is a processing of performing m local neighboring image operations for one input image 1 and unifying m output images 2 thus obtained to provide a final result. This multi-mask processing is used for an edge enhancement processing, etc. The main module 10 in accordance with this invention permits the processings prior to the unification in the multi-mask processing to be performed by one image scanning. In the case of the multi-mask processing with the number of masks set at m, the image data is taken in once in m machine cycles, and line buffer 20 and VSR 31 also operate once in m machine cycles. VSR 31 continues to supply the same image data to parallel operation unit 30 in m machine cycles. Parallel processing unit 30 produces m coefficient patterns for one image data during m machine cycles and performs the arithmetic thereof with the image data every one machine cycle. M operation results are sequentially output from operation data output port 65 during m machine cycles. Further, this multi-mask processing can be combined with the time division processing as mentioned above. In the case of the time-division multimask processing with the numbers of time-divisions and masks being set at t and m, respectively, the image data is taken in once in t×m machine cycles and m operation results are sequentially output every t machine cycles.

The above time-division multi-mask processing can be realized by externally operating control circuit 21 to set a control signal MSKTMS from control circuit 21 giving (mask number×time division number −1) and another control signal TMS from control circuit 21 giving (time division number −1).

Figure 3:
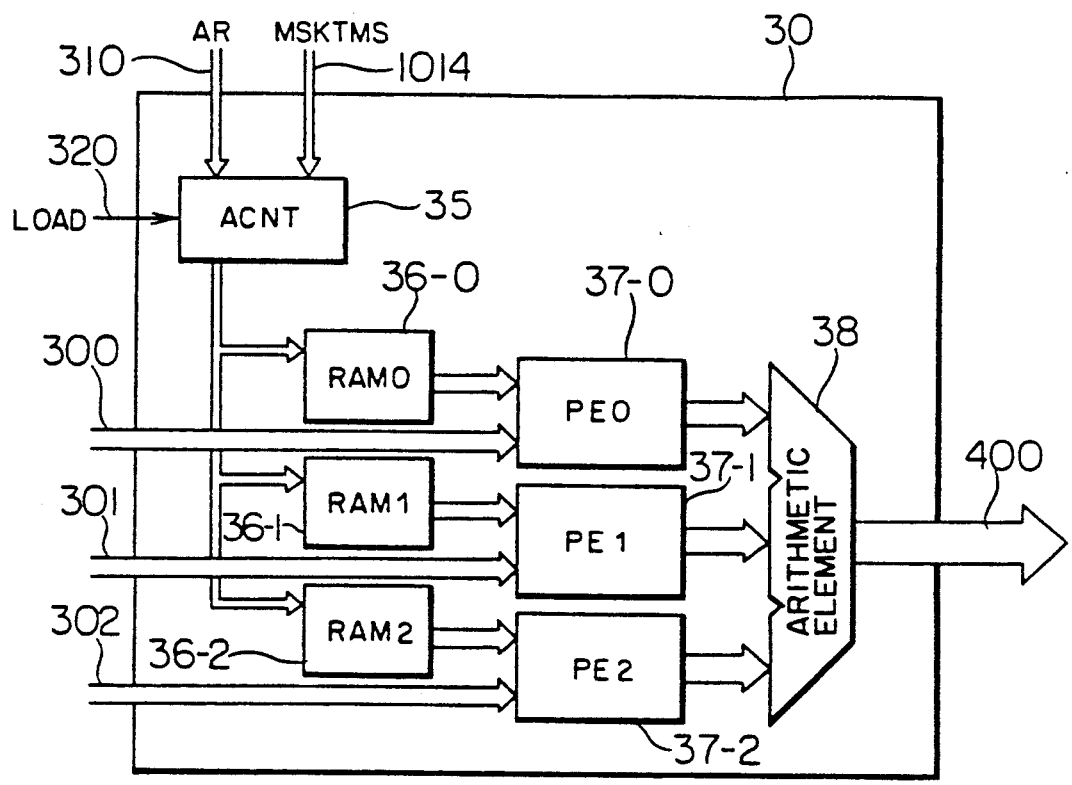
FIG. 3 is a block diagram of a parallel operation section inside the main module.

FIG. 3 illustrates a detailed arrangement of a parallel operating section 30. In this figure, output signal lines 300, 301 and 302 from VSR's 31-0, 31-1, and 31-2 are connected to one input of three processor elements (PE's) 37-0, 37-1 and 37-2, respectively. The other inputs thereof are connected with three coefficient memories 36-0, 36-1 and 36-2 which supply the previously stored coefficient data to the corresponding processor elements 37 in accordance with address outputs from, a counter 35. The outputs from operation circuits are unified by an arithmetic element 38 and the unified data are fed to unifying circuit 40 through a signal line 400.

In the case of MSKTMS1014≠0, the time division processing or multi-mask processing is realized, and coefficient memories 36 read out the coefficient data at addresses which are supplied from a counter 35 and changed every one machine cycle and supply them to processor elements 37.

Figure 4:
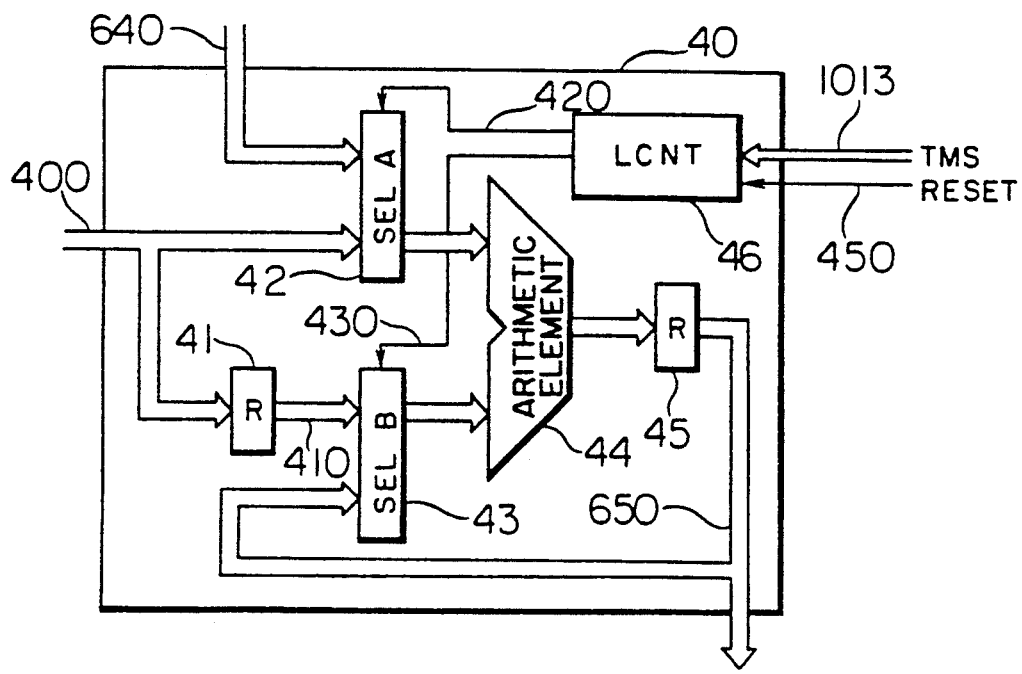
FIG. 4 is a block diagram showing a unifying circuit inside the main module.

FIG. 4 illustrates a detailed arrangement of unifying circuit 40. The output from parallel operating section 30 is fed to a register 41 and a selector 42 through signal line 400. The output from register 41 is fed to selector 43. Selector 42 selects the operation data supplied from operation data input port 64 through a signal line 640 and the output from parallel operating section 30 and supplies them to an arithmetic unit 44. A selector 43 selects an output line 410 from register 41 and an output line 650 from unifying circuit 40 and supplies them to arithmetic unit 44. The output from arithmetic unit 44 is fetched to the external from operation data output port 65 through signal line 650.

Selectors 42 and 43 are controlled by control signals 420 and 430 from a counter 46, respectively. Counter 46 is controlled by a reset signal 450 and a control signal TMS1013 providing (time division number −1) which are supplied from control circuit 21 in such a manner that it is reset when the reset signal is "HIGH" and repeats the count up from 0 to TMS. With TMS=0, selectors 42 and 43 always select signal lines 640 and 410, respectively. With TMS≠0, selector 42 selects signal line 640 only when the value of counter 46 becomes equal to TMS, and selector 43 selects signal line 410 only when the value of counter 46 becomes zero.

Figure 5:
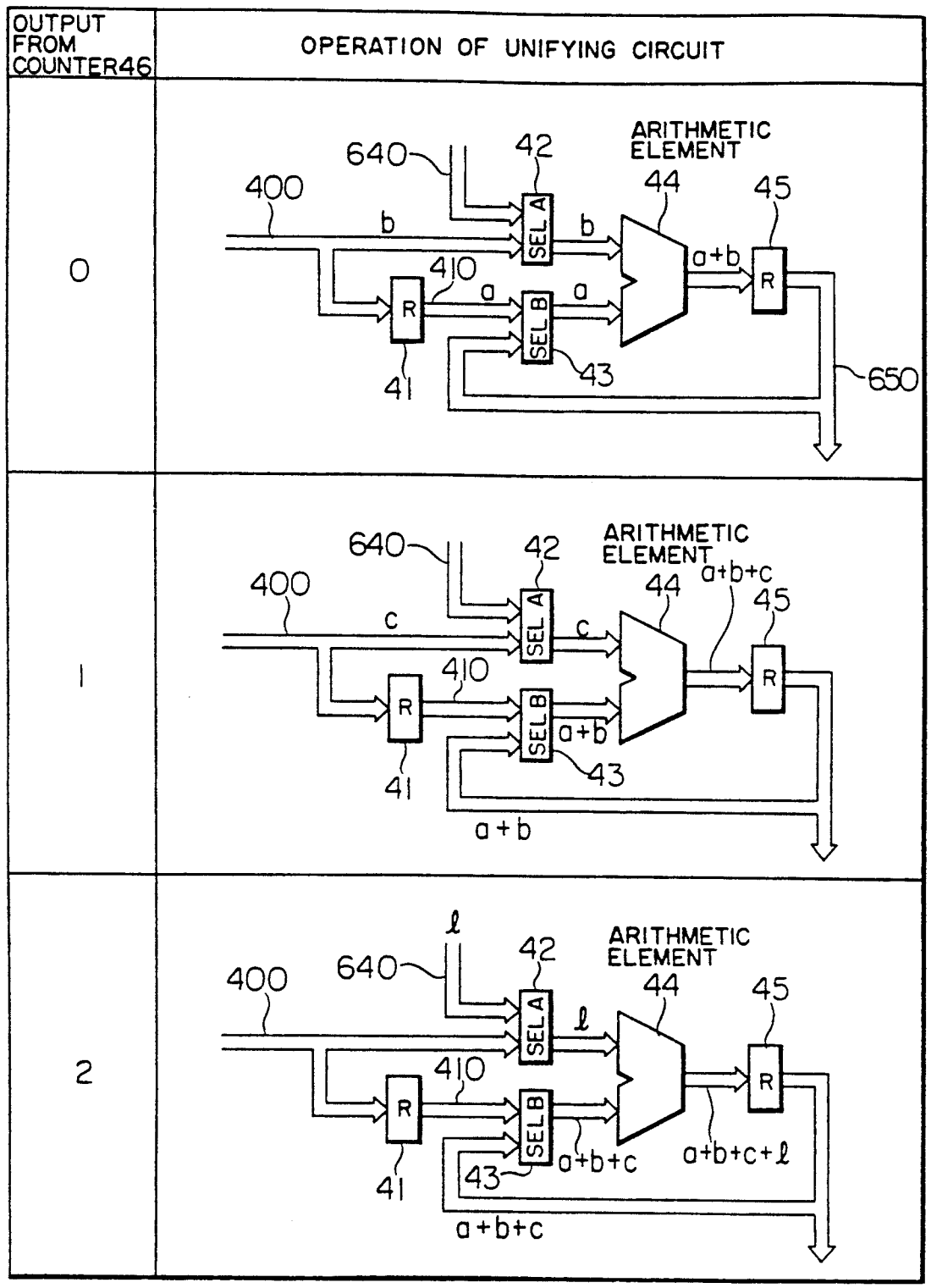
FIG. 5 is a block diagram for explaining the examples of the operation of the unifying circuit.

FIG. 5 shows the operation of unifying circuit 40 when TMS=2. Unifying circuit 40 unifies, during (TMS+1) machine cycles, (TMS+1) operation data supplied during the cycles and one operation data supplied from data line 640.

In the case shown in FIG. 5, operation data $\bar{a}$, $\bar{b}$ and $\bar{c}$ on data line 400 and an operation data $\bar{1}$ on data line 640 are unified by the addition thereof. During a first machine cycle, the operation data $\bar{a}$ and $\bar{b}$ are added. During a second machine cycle, $\bar{a}+\bar{b}$ and $\bar{c}$ are added to provide $\bar{a}+\bar{b}+\bar{c}$. During a third machine cycle, $\bar{a}+\bar{b}+\bar{c}$ and $\bar{1}$ are added. And during the subsequent machine cycle, the unifying result $\bar{a}+\bar{b}+\bar{c}+\bar{1}$ are fetched from register 45.

Figure 6:
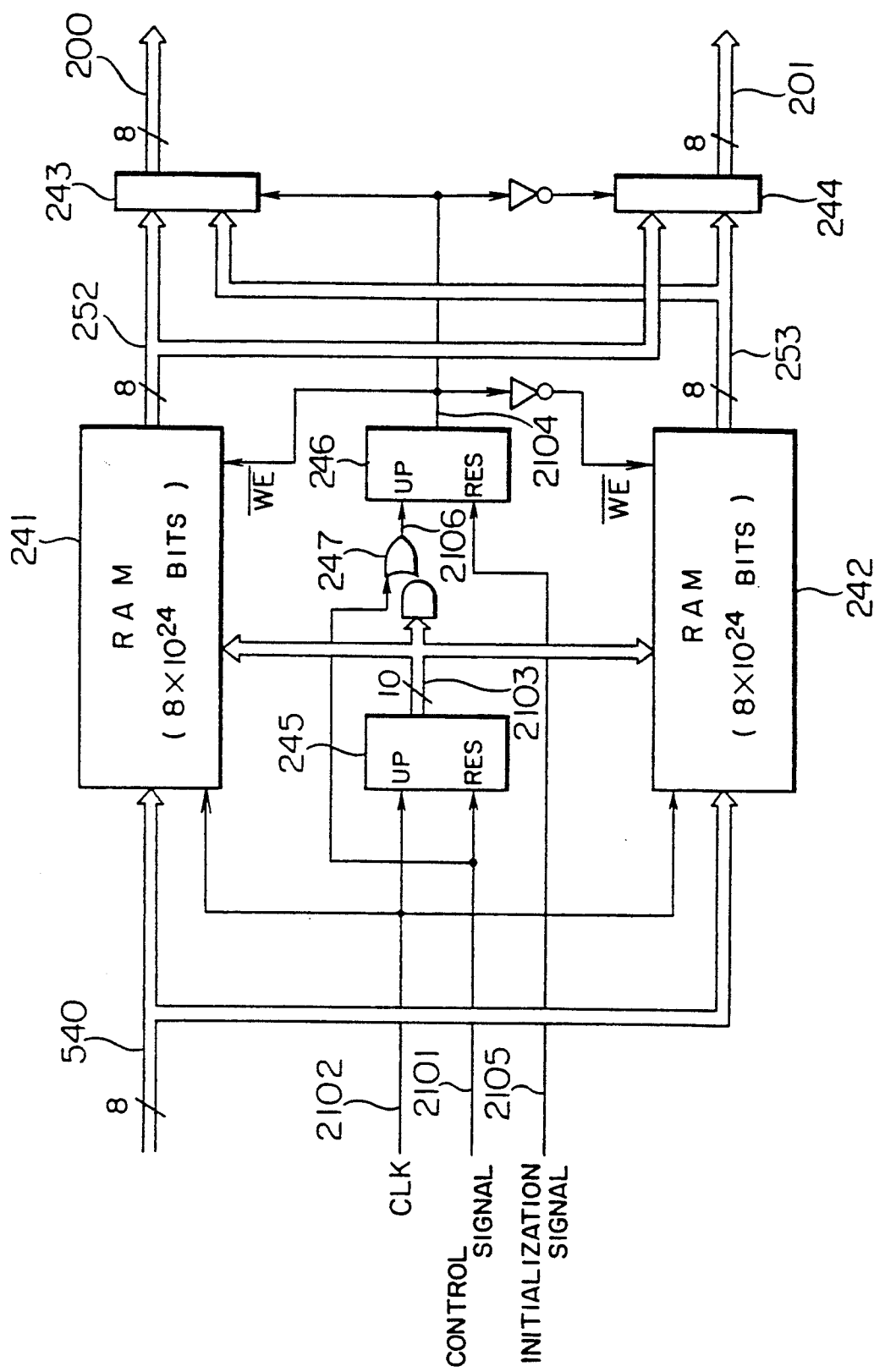
FIG. 6 is a block diagram showing the arrangement of a line buffer inside the main module.

FIG. 6 illustrates a detailed arrangement of two line buffers 20-0 and 20-1 of FIG. 1 which is constructed by RAM's.

The arrangement as shown in FIG. 6 is adapted to permit the number of delaying steps to be altered, i.e. to form two line buffers which can delay 8 bit data by 1024 steps at its maximum or one line buffer which can delay 8 bit data by 2048 steps at its maximum.

In FIG. 6, RAM's 241 and 242 have a storage capacity of 8×1024 bits, respectively. When a clock signal 2102 is on its high level (hereinafter simply referred to as "High"), the 8 bit data of RAM's 241 and 242, which correspond to the output of a row address control circuit 245, 10 bit row address signal 2103, are read out on signal lines 252 and 253, respectively. When clock signal 2102 is on its low level (hereinafter simply referred to as "Low") and an output data 2104 from an input-/output information control circuit 246 is "Low", the 8 bit data on input signal line 540 is stored at the address of RAM 241 corresponding to row address signal 2103. On the other hand, when clock signal 2102 is "Low" and output data 2104 from input/output information control circuit 246 is "High", the 8 bit data on input signal line 540 is stored at the address of RAM 242 corresponding to row address signal 2103. The respective 8 bit data on signal lines 252 and 253, read out from RAM's 241 and 242 are fed to selectors 243 and 244, respectively.

Selector 243 selects the data on signal line 252 when signal line 2104 is "Low" and selects the data on signal line 253 when signal line 2104 is "High", and delivers them to an output signal line 200. On the other hand, selector 244 selects the data on signal line 253 when signal line 2104 is "Low" and selects the data on signal line 252 when signal line 2104 is "High", and delivers them to an output signal line 201.

Row address control circuit 245 is a 10 bit binary counter which is counted up each time control signal 2101 becomes "Low" and clock signal 2102 becomes "High", and is initialized to zero when control signal 2101 becomes "High". Row address control circuit 245 delivers the counted data to a logic circuit 247 as well as RAM's 241 and 242 as 10 bit row address signal 2103. Logic circuit 247 delivers a "High" level output to a signal line 2106 when all the 10 bit row address signals are "High" or when signal line 2101 is "High". In any other case, logic circuit 247 delivers a "Low" level output.

Input/output information control circuit 246 is a one bit counter (i.e. T flip-flop) which changes the status of signal line 2104 from "High" to "Low" or from "Low" to "High" each time an initialization signal 2105 becomes "Low" and signal line 2106 becomes "High". When initialization signal 2105 is "High", signal line 2104 is initialized to "Low".

The circuit of FIG. 6 operates as follows.

It is assumed that as an initial state, control signal 2101, clock signal 2102 and initialization signal 2105 are all "Low". Now, after initialization signal 2105 is changed to "High" and "Low", control signal 2101 is made "High". Then, the output signal 2103 from row address control circuit 245 is zero and the output signal 2104 from input/output information control circuit 246 is "Low". Thereafter, control signal 2101 is changed to "Low", and clock signal 2102 is changed from "Low" to "High" and further to "Low". At this time, while clock signal 2102 is "High", the content 8 bits at the 0-th address of RAM 241 is read out onto output signal line 200 through signal line 252 and selector 243, and the content 8 bits at the 0-th address of RAM 242 is fed onto output signal line 201 through signal line 253 and selector 244. When clock signal 2102 becomes "Low", the 8 bit data on input signal line 540 is stored or written at the 0-th address of RAM 241. Then, the contents of RAM 242 does not vary at any row address.

Thereafter, each time clock signal 2102 is changed from "Low" to "High" and further to "Low", the row address of read-out and write-in is increased one by one, but in the same manner as mentioned above, the data read out from RAM 241 is fed to output signal line 200, the data read out from RAM 242 is fed to output signal line 201 and the 8 bit data on input signal line 540 is stored at the address of RAM 241 corresponding to the present row address signal.

It is now assumed that control signal line 2101 has become "High" before row address signal line 2103 reaches 1023. Then, signal line 2106 is changed from "Low" to "High". The level change of signal line 2106 changes the state of input/output information control circuit 246, making signal line 2104 "High". Thus, the selection states in selectors 243 and 244 are switched so that signal line 252 is connected with output signal line 201 and signal line 253 is connected with output signal line 200. A writable RAM is shifted from RAM 241 to RAM 242 so that RAM 241 is not writable. The output signal (row address signal line) 2103 from row address control circuit 245 is initialized to zero.

Thereafter, if after control signal 2101 is made "High", clock signal 2101 is pulsed, the row address signal 2103 is increased from zero one by one. When clock signal 2102 is "High", in accordance with the present row address signal, the data read out from RAM 241 is fed to output signal line 201 through signal line 252 and selector 244 while the data read out from RAM 242 is fed to output signal line 200 through signal line 253 and selector 243. When clock signal 2102 is "Low", the data on input signal line 540 is stored at the address of RAM 242 corresponding to the present row address signal 2103.

The relation between the arrangement of FIG. 6 and the main module of FIG. 1 will be explained below.

It is now assumed that the contents of RAM's 241 and 242 in FIG. 6 are undefined as their initial state, its horizontal direction.

In FIG. 6, the image data of input image 1 is input from input signal line 540 and first written into RAM 241. Namely, 100 image data belonging to the first raster are sequentially written at the row addresses 0 to 99 of RAM 241. Then the undefined data are read out from RAM's 241 and 242. Next, 100 image data (pixel data) belonging to the second raster written at the row addresses 0 to 99 of RAM 242. Then, the first raster image data is read out from RAM 241 while the undefined data is read out from RAM 242.

100 image data belonging to the third raster are written at the row addresses 0 to 99 of RAM 241. Then, the first raster image data is read out from RAM 241 to output signal line 200 through signal line 252 and selector 243 while the second raster image data is read out from RAM 242 to output signal line 201 through signal line 253 and selector 244. Moreover, 100 image data belonging to the fourth raster are written at the row addresses 0 to 99 of RAM 242. Then, the second raster image data are read out from RAM 242 to output signal line 200 through signal line 253 and selector 243 while the third raster image data are read out from RAM 241 to output signal line 201 through signal line 252 and selector 244.

Namely, when the third raster image data is input, RAM's 241 and 242 output the data as line buffers 20-1 and 20-0, respectively. On the other hand, when the fourth raster image data is input, RAM's 241 and 242 output the data as line buffers 20-0 and 20-1, respectively.

Generally, the odd numbered raster image data is written in RAM 241 whereas the even numbered raster image data is written in RAM 242. The raster image data read out from RAM's 241 and 242 is fed to the output signal lines 200 and 201 in such a way that the smaller-numbered raster image data is fed to output signal line 200 whereas the larger numbered raster image data is fed to output signal line 201.

When the number of delayed steps exceeds 1024, i.e., the row address number reaches 1023, signal line 2106 becomes "High" so that the output signal 2104 from input/output information control circuit 246 is changed in its state. Thus, writing into one RAM is ceased and writing into the other RAM begins (this writing is started from the 0-th address thereof). Also, when the signal 2104 is changed in its state the connection states between RAM's 241 and 242 and output signal lines 200 and 201 are switched. Accordingly, the arrangement shown in FIG. 6 can be used as a 8-bit 2048 step line buffer having input signal 540 and output signal 200.

The line buffers as described above were constructed by RAM's which are suitable for LSI, but it is needless to say that they can be also constructed by shift registers.

Figure 7:
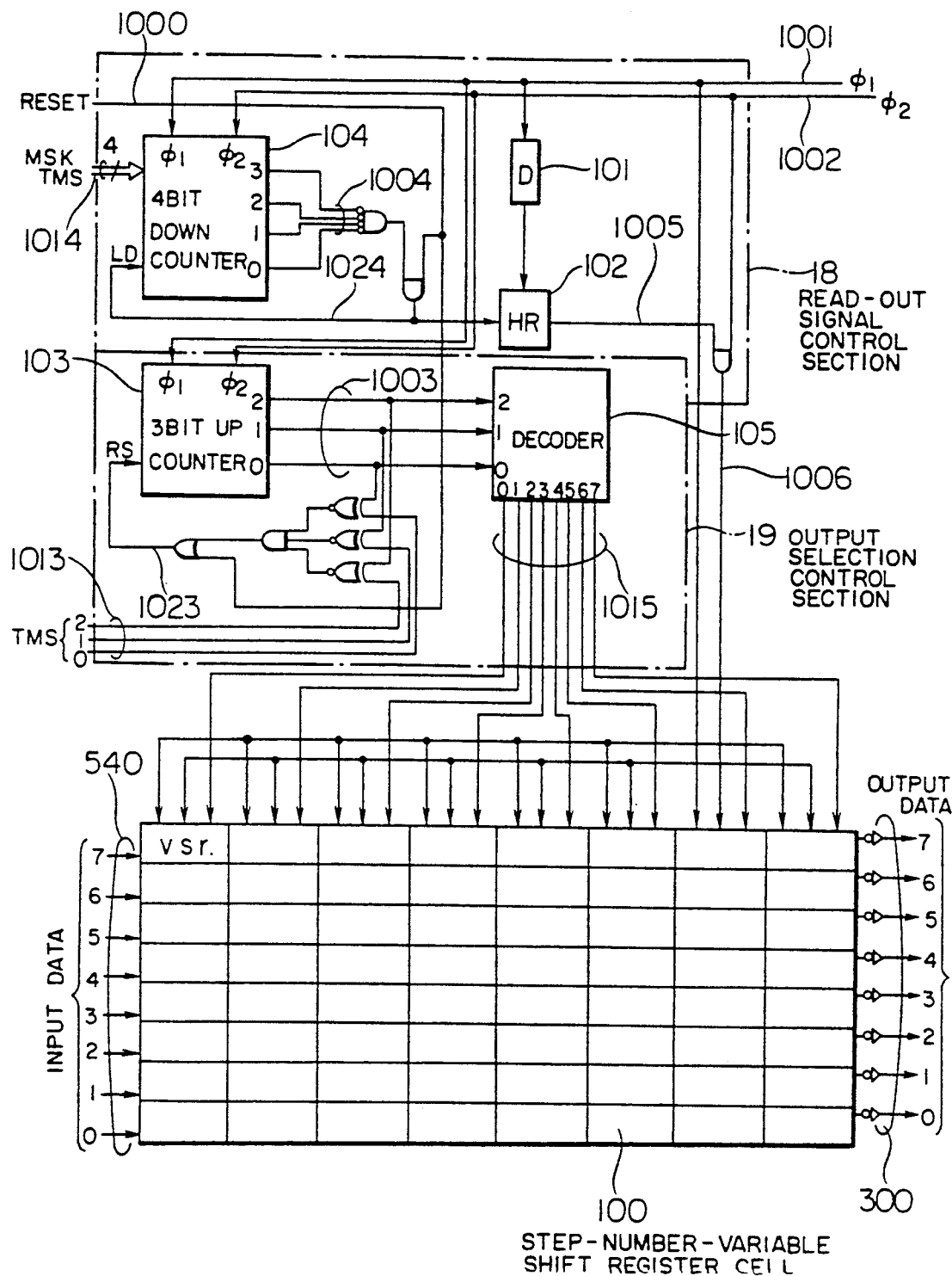
FIG. 7 is a block diagram showing one arrangement of a step-number-variable shift register inside the main module.

FIG. 7 illustrates one detailed arrangement of VSR 31-0.

VSR 31-0 consists of a read-out signal control section 18 for performing a shifting operation 18, an output selection control section 19 and variable-step-number shift register cells (vsr) 100. The image data raster-scanned from input image 1 is input to vsr's 100 from input data line 540 as 8 bit data. The output from vsr's 100 is fed to parallel operating section 30 and selector 33-0. Each vsr 100 performs the input and shift of the data by the read-out and write-in of the data during one machine cycle. In VSR 31-0 shown in FIG. 6, each vsr 100 performs the write-in and read-out of the data in accordance with a write enable signal $\phi_1$ 1001 in synchronism with a clock and a read enable signal $\phi_2'$ 1006 supplied from read-out signal control section 18. The output selection signal 1015 supplied from output selection control section 19 is fed to a clock gate 1500 (FIG. 8) constituting a selector, which is embedded in vsr 100. When the data in the vsr 100 in which output selection signal 1015 becomes "High" is fed to output data line 300 as an output from the selector.

Read-out signal control section 18 in FIG. 7 takes in (inputs) a read enable signal 1002 in synchronism with a clock pulse and outputs a read enable signal 1006 which intermittently becomes "High".

The read-out signal control section for performing a shifting operation consists of a 4-bit down counter 104, a half register (HR) 102 and a delay circuit 101. 4-bit down counter 104 is one which is counted down each clock pulse. When a reset signal 1000 becomes "High" or a counter output 1004 becomes zero, a load signal 1024 becomes "High", and during the subsequent machine cycle, 4 bit data MSKTMS 1014 is loaded into the 4 bit down counter 104 from control circuit 21. HR 102 and delay circuit 101 generate a read control signal 1005 having delayed load signal 1024 by a half machine cycle so that read enable signal 1006 can be "High" during a machine cycle subsequent to the machine cycle during which load signal 1024 has become "High".

Output selection control section 19 consists of a 3-bit up counter 103 and a decoder 105 and switches output selection signal 1015 every one machine cycle. 3-bit up-counter 103 is one which is counted up every clock. When reset signal 1000 becomes "High", or the counter output coincides with the 3 bit data TMS 1013 supplied from control circuit 21, a reset signal 1023 becomes "High", and during the subsequent machine cycle, the 3-bit up-counter 103 is reset. The output 1003 from 3-bit up-counter 103 is decoded by decoder 105 and becomes output selection signal 1015.

It should be noted that the step number of a shift register 31-0 can be altered by the TMS signal and is (TMS+1) when a predetermined value is set at TMS.

Figure 8:
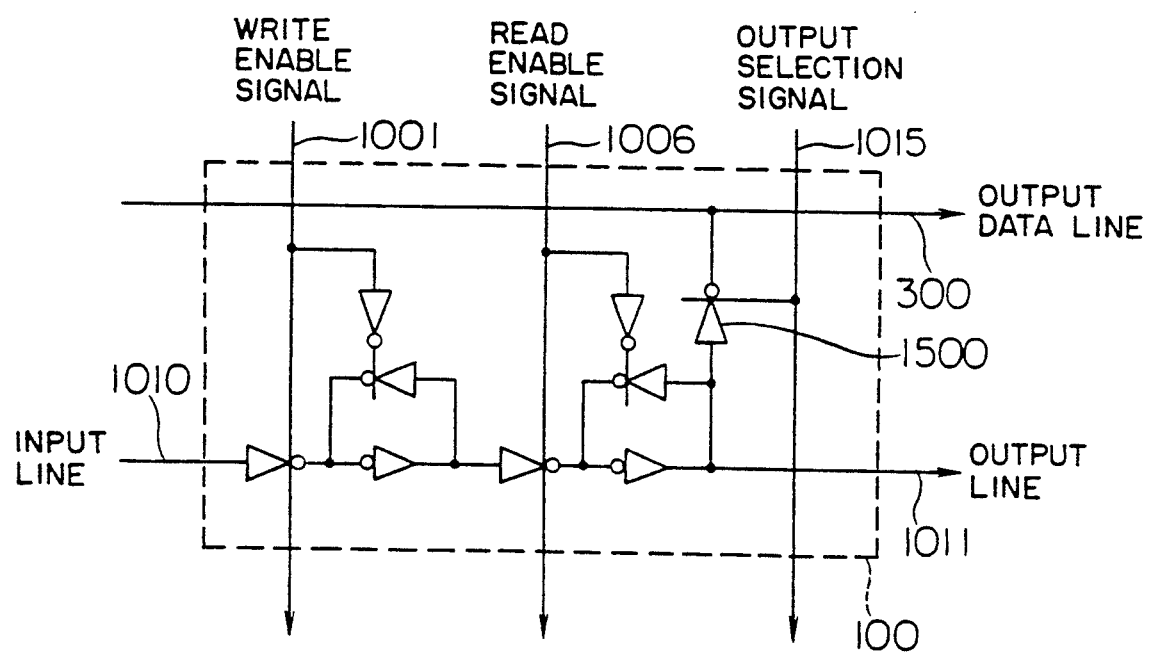
FIG. 8 is a circuit diagram of each of the cells in the step-number-variable shift register.

FIG. 8 shows the details of vsr 100 which is 1bit one step shift register. The vsr 100 performs the data shifting by reading out the data in vsr 100 to an output line 1011 during the former half of one machine cycle and by writing the data from an input line 1010 into vsr 100. Input line 1010 is connected with input data line 540 at the first step vsr 100, and is connected with the output line 1011 of the previous step vsr 100 at the vsr's other than the first step vsr. The data in vsr 100 is fed to output data line 300 when output selection signal 1015 is "High".

Figure 9:
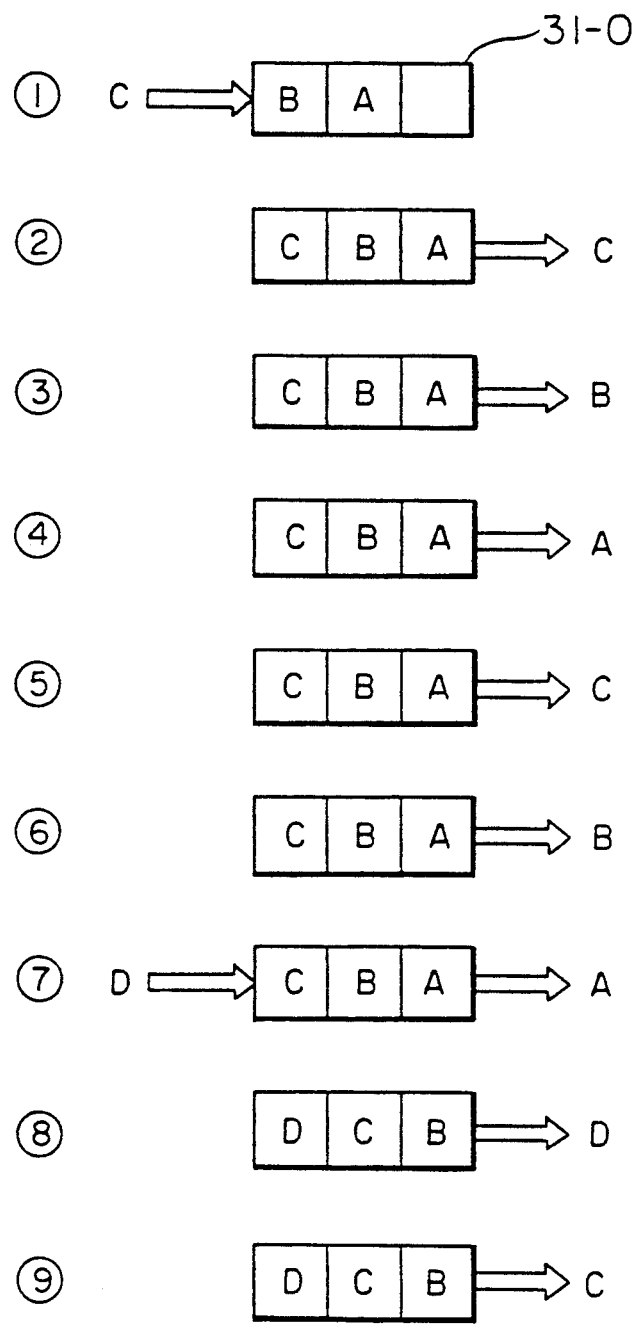
FIG. 9 is a view for explaining the operation of the variable step shift register of FIG. 7.
Figure 10:
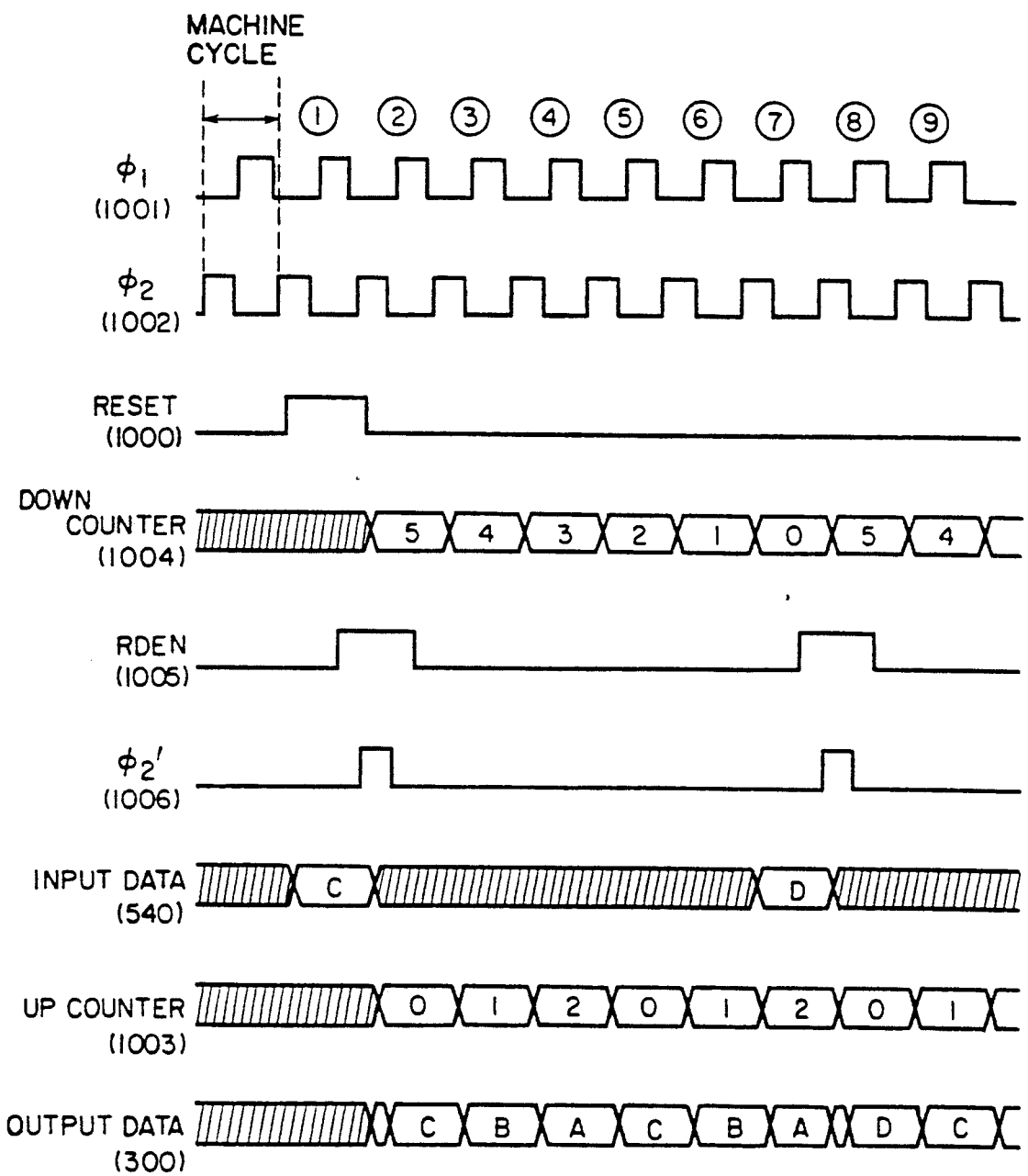
FIG. 10 is a timing chart of the step-number-variable shift register of FIG. 7.

FIG. 9 shows the operation of VSR 31-0 when MSKTMS=5 and TMS=2, and FIG. 10 is a timing chart thereof. VSR 31-0 inputs and shifts the data once in (MSKTMS+1) machine cycles and sequentially outputs the data in VSR 31-0 during (TMS+1) machine cycles. In the case of FIG. 9 the data is input and shifted once in 6 machine cycles in VSR 30-0 and the data stored in VSR 31-0 is sequentially output during 3 machine cycles.

Symbols ①, . . . ⑨ shown in FIGS. 9 and 10 designate a first, . . . a ninth machine cycle, respectively. The first machine cycle corresponds to the state where data A and B are stored in VSR 31-0 and data C has reached input data line 540. Then, when reset signal 1000 is made "High", the 4-bit down counter and 3-bit up counter are initialized, respectively. Also, since the read-out control signal (RDEN) 1005 is "High" from the first machine cycle to the second machine cycle, read enable signal $\phi_2'$ 1006 is "High" in the second machine cycle. Thus, from the first machine cycle to the second machine cycle, the data C is input in VSR 31-0 and the data A and B are shifted rightwards by one step.

During the second machine cycle to the seventh machine cycle, 3-bit up counter 103 continues to count as 0, 1, 2, 0, 1, 2, so that the data A, B and C stored in VSR 31-0 is output in the order of C, B, A, C, B, A.

At the seventh machine cycle, the subsequent data D reaches input data line 540. Then, 4 bit down counter 104 output zero and the read-out control signal (RDEN) 1005 is high from the seventh machine cycle to the eighth machine cycle so that as in the first to second machine cycles, from the seventh machine cycle to the eighth machine cycle, a data D is input in VSR 31-0 and further, the data B and C are shifted rightwards by one step, and the data A is abandoned. Thereafter, during six machine cycles from the eighth machine cycle, the data B, C and D are preserved, and sequentially read out from VSR 31-0 in the order of D, C, B, D, C, B.

According to one arrangement of VSR 31-0 as shown in FIG. 7, local neighboring (Kernel) image can be cut out from the raster scanned input image 1 intermittently supplied and preserved in the step-number-variable shift register (VSR). And also, the preserved local neighboring image data can be supplied to an operation circuit in a time division manner.

Figure 11:
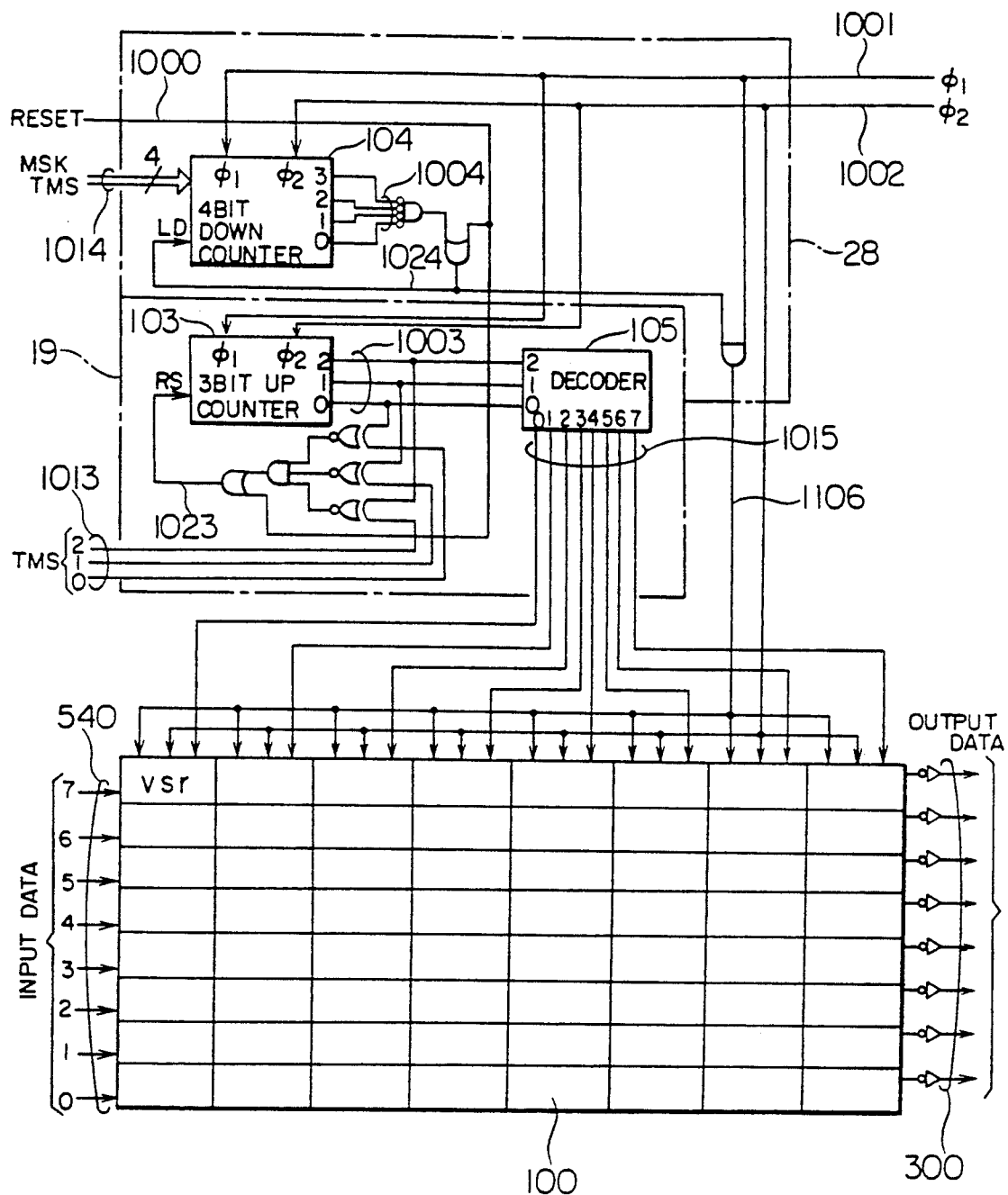
FIG. 11 is a block diagram showing another arrangement of a step-number-variable shift register inside the main module.

FIG. 11 shows another arrangement of VSR 31-0. In this arrangement VSR 31-0 consists of a write signal control section 28 for performing a shifting operation, an output selection control section 19 and step-number-variable shift register cells (vsr) 100. In this arrangement, each vsr 100 performs the write-in and read-out of the data in accordance with a write enable signal $\phi_1'$ 1106 output from write signal control section 28 and the read enable signal $\phi_2'$ 1002 in synchronism with a clock, respectively.

Write signal control section 28 corresponds to read signal control section 18 of FIG. 7 which performs a shifting operation, and takes in (inputs) write enable signal 1001 in synchronism with a clock and outputs write enable signal 1106 which intermittently becomes "High". In the arrangement of FIG. 11, write enable control section 28 consists of the 4-bit down counter 104 only, and the load signal 1024 from 4-bit down counter 104 is employed as a write control signal as it is.

Figure 12:
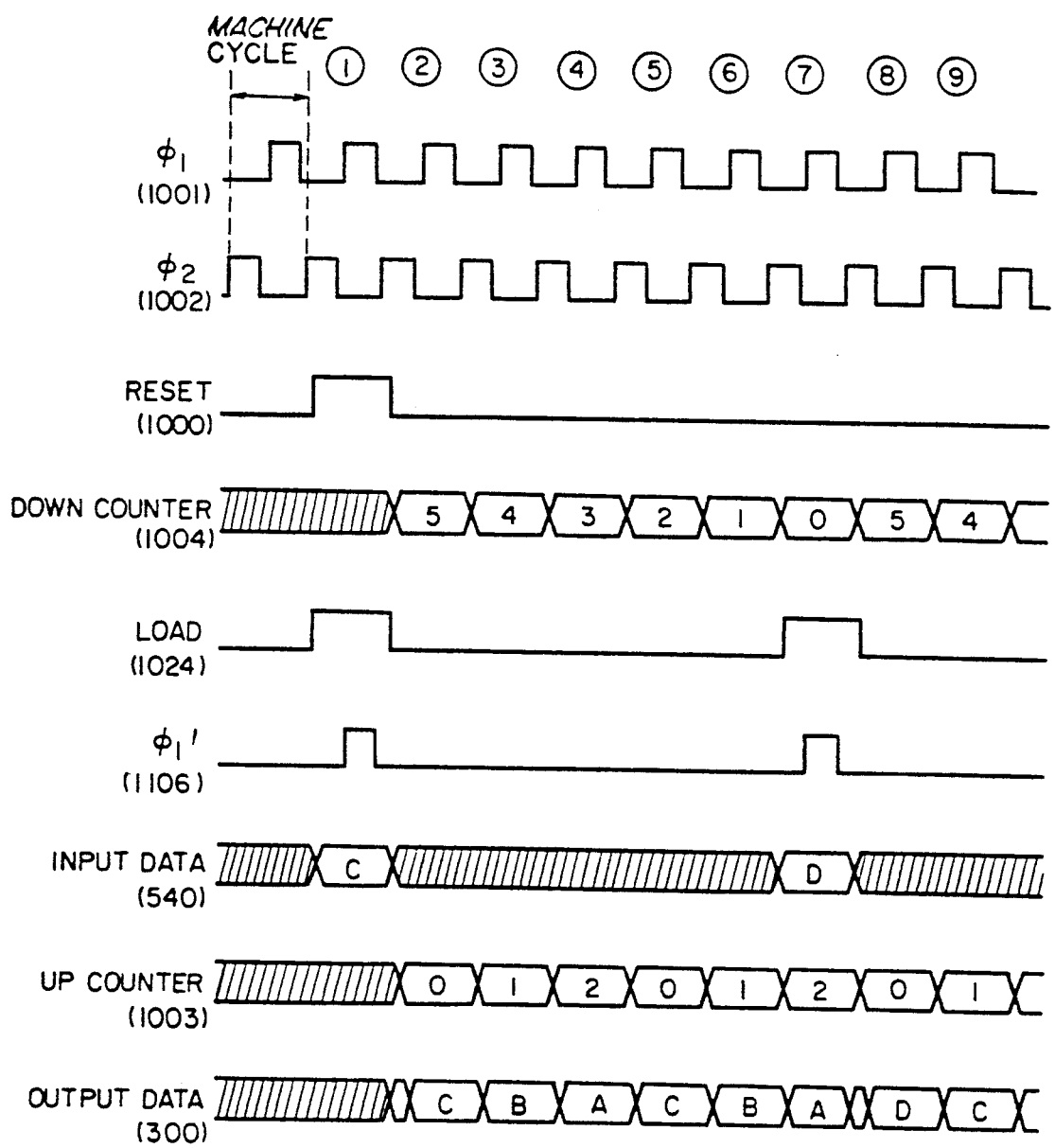
FIG. 12 is a timing chart of the step-number-variable shift register of FIG. 11.

FIG. 12 shows a timing chart of the operation of VSR 31-0 when MSKTMS=5 and TMS=2 in this arrangement. The operation in this arrangement is the same as that of the arrangement of FIG. 9. In the timing chart of FIG. 12, in the first and seventh machine cycles, the load signal 1024 from 4-bit down-counter 104 becomes "High" and write enable signal $\phi_1'$ 1106 becomes also "High". Thus, the data C is input in VSR 31-0 from the first machine cycle to the second machine cycle and also the data A and B are shifted rightwards by one step, respectively; the data D is input in VSR 31-0 from the seventh machine cycle to the eighth machine cycle and also the data B and C are shifted rightwards by one step, respectively.

According to this arrangement of VSR 31-0, the same effect as in the previous arrangement shown in FIG. 7 can be attained by less amount of hardware than the latter.

Figure 13:
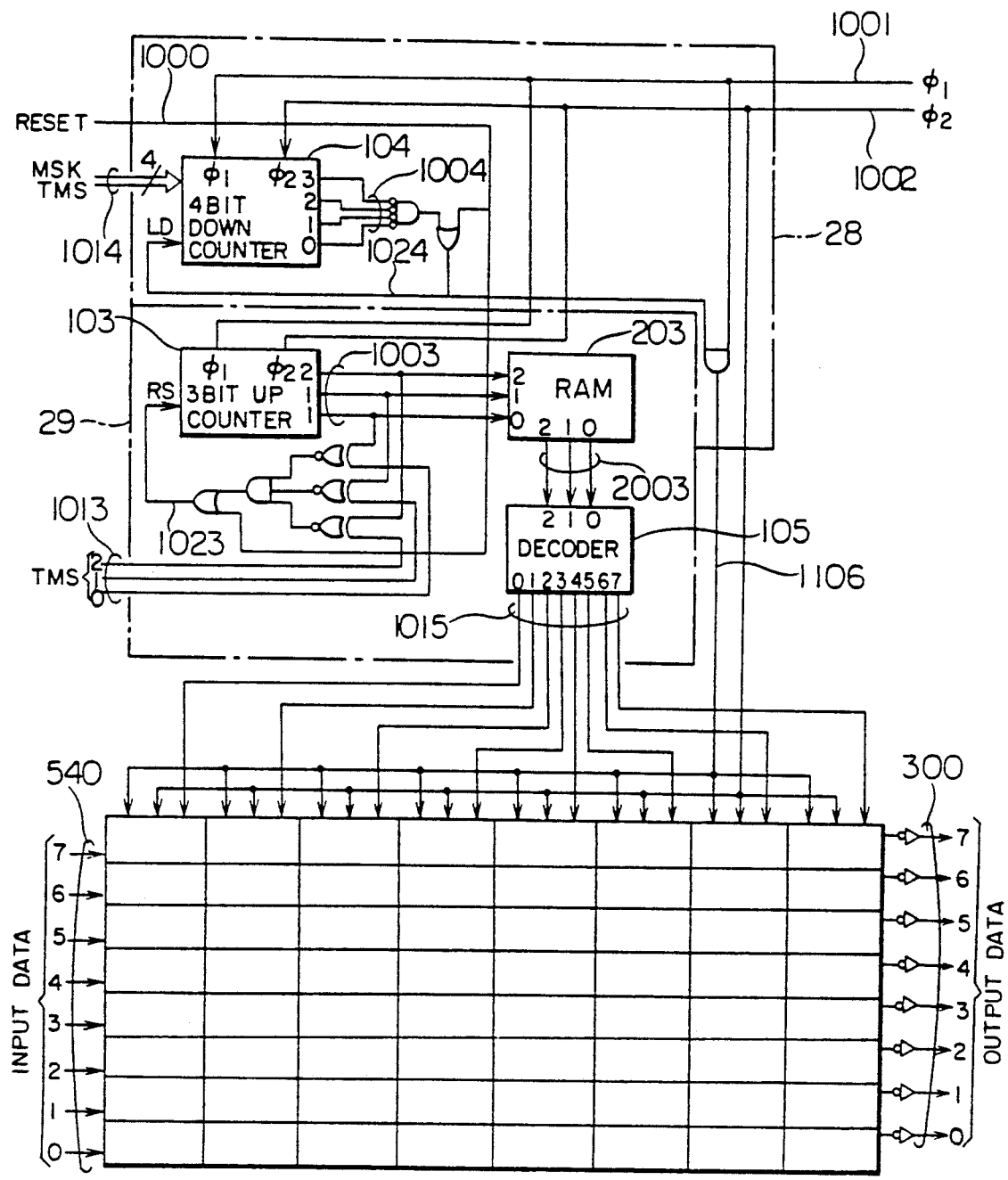
FIG. 13 is a block diagram showing still another arrangement of a step-number-variable shift register inside the main module.

FIG. 13 shows still another arrangement of VSR 31-0. In this arrangement, VSR 31-0 consists of a write control section 28 for performing a shifting operation, an output selection control section 29 and step-number-variable shift register cells (vsr) 100.

The output selection control section 29 in this arrangement consists of a 3-bit up counter, an RAM 203 and a decoder 105. The counter output line 1003 constitutes an address line for RAM 203, and the contents at the address, specified by counter output line are fetched from the RAM output line 2003, fed to decoder 105, converted into an output selection signal 1015 which is supplied to vsr 100.

Figure 14:
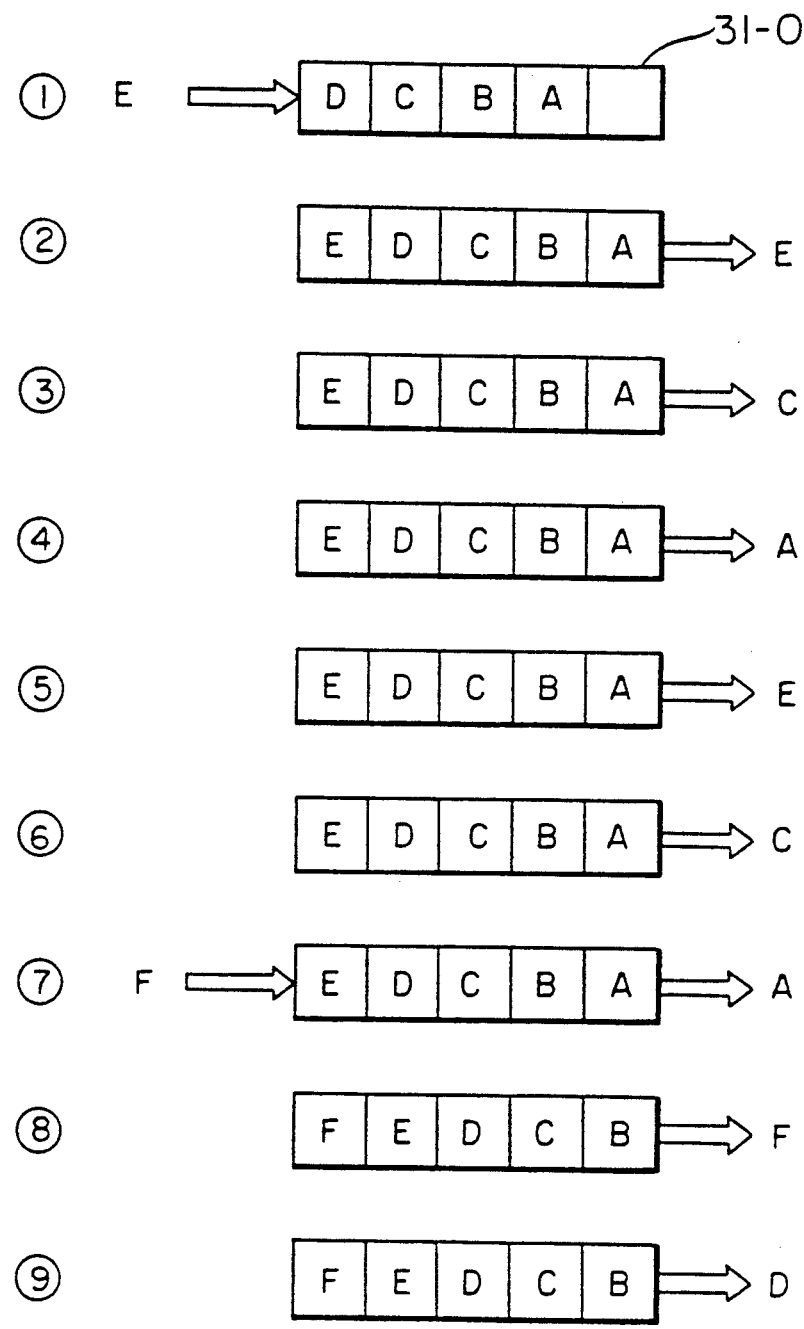
FIG. 14 is a view for explaining the operation of the step-number-variable shift register of FIG. 13.
Figure 15:
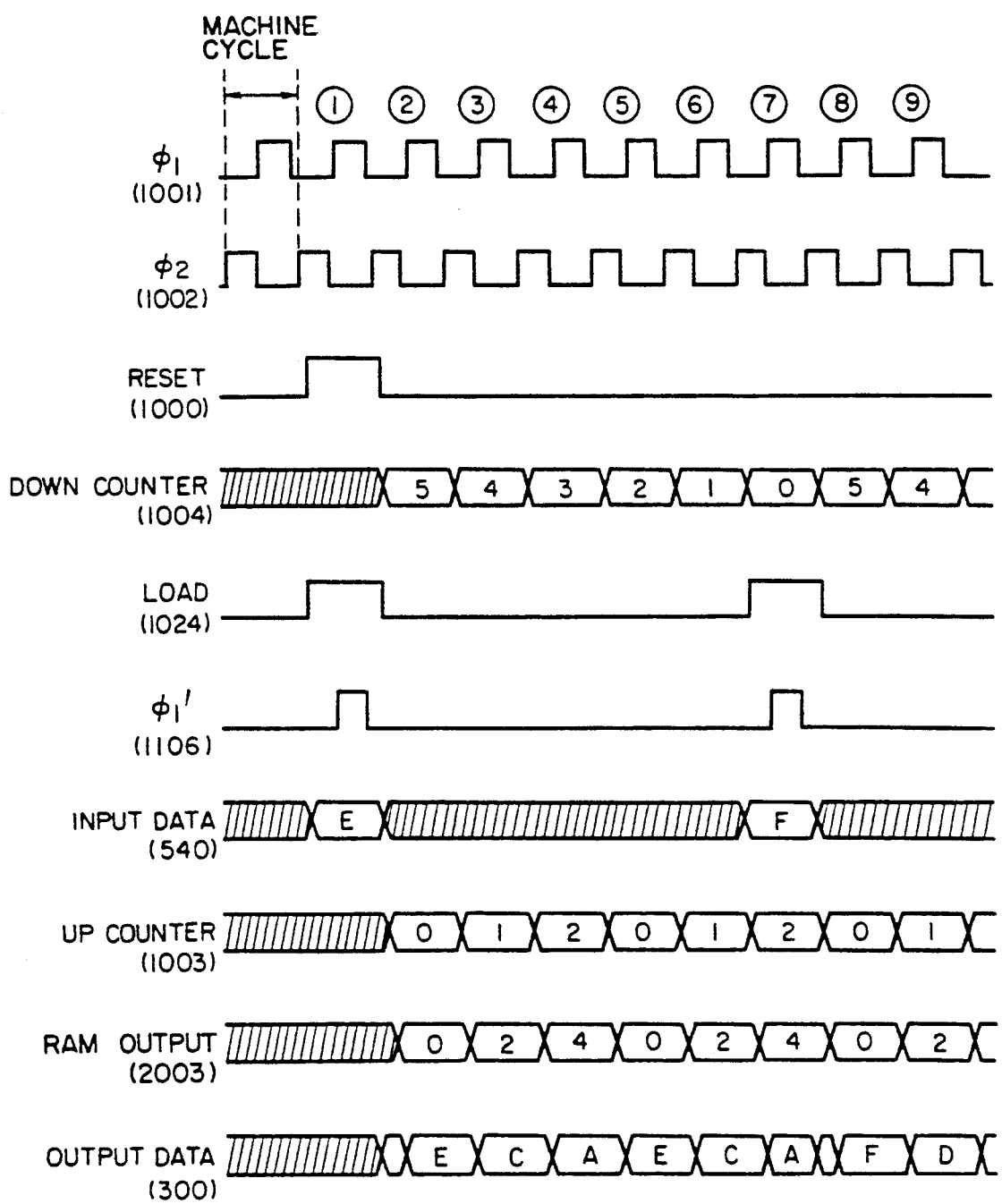
FIG. 15 is a timing chart of the step-number-variable shift register of FIG. 13.

There is shown in FIG. 14 the operation of VSR 31-0 when 0, 2 and 4 have been previously stored at the addresses of RAM 203, and shown in FIG. 15 its timing chart. In FIGS. 14 and 15, MSKTMS and TMS are set at 5 and 2, respectively.

The input and shifting of the data are performed from the first machine cycle to the second machine cycle, and thereafter during the second to seventh machine cycles, the contents A, C and E of vsr 100, which are specified every clock pulse by the RAM output line, are read out in the order of E, C, A, E, C, A. Further, the input and shifting of the data are performed from the seventh machine to the eighth machine cycle, and thereafter the contents B, D and F of vsr 100 are read out in the order of F, D, B, F, D, B in accordance with the RAM output 2003.

In accordance with this arrangement of VSR 31-0, by previously setting the data in the RAM, any data stored in the variable step shift register can be read out in any order so that scattered local neighboring images can be efficiently processed in a time division manner.

Figure 16:
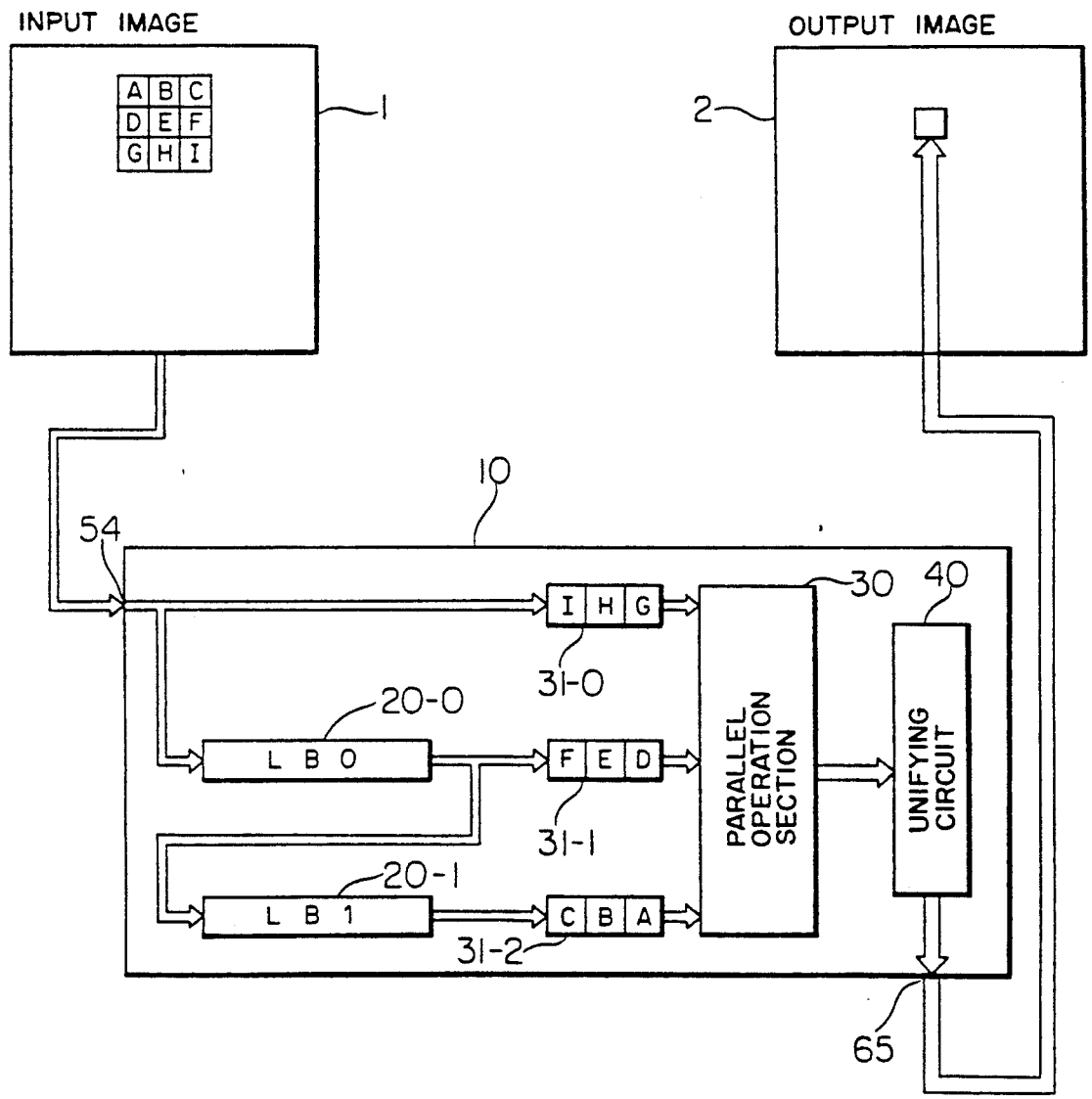
FIGS. 16 to 18 are block diagrams showing examples of the application of the main module, respectively.

FIG. 16 shows an arrangement for performing a 3×3 local neighboring image data operation every three machine cycles in a time division manner using one main module 10 shown in FIG. 1. In this arrangement, each of VSR's 31-0, 31-1 and 31-2 preserves 1×3 local neighboring image data in three time division processings, and these VSR's are arranged in a manner of 3×1 by switching selectors 33-0 and 33-1. Thus, as a whole, 3×3 local neighboring image data are preserved in these VSR's. This arrangement is implemented in such a way that the control circuit 21 is externally operated so that MSKTMS and TMS are set at 2 and selectors 33-0 and 33-1 can select data lines 200 and 201, respectively. It should be noted that only one main module 10 is used so that the data is not required to be sent to image data output port 55 through selector 70.

Input image 1 is raster-scanned once in three machine cycles and is fed to VSR 31-0 and line buffer 20-0 through image data input port 54 one image data during every three machine cycles. Line buffer 20-0 delays the image data by the time required to scan one line of the input image 1. The output from line buffer 20-0 is fed to VSR 31-1 and line buffer 20-1. Line buffer 20-1, like line buffer 20-0, delays the image data by the time required to scan one line of the input image 1 and supplies the delayed image data to VSR 31-2. VSR's 31-0, 31-1 and 31-2 take in one image data once in three machine cycles and shift them, respectively. Then, nine local neighboring image data A, B, C, D, E, F, G, H and I required to calculate one image data of output image 2 are preserved inside VSR's 31-0, 31-1, 31-2 during the three machine cycles.

The local neighboring image data preserved in VSR's 31-0, 31-1 and 31-2 are read out in a time division manner during the three machine cycles, and fed to processor elements (PE's) 37-0, 37-1 and 37-2 (FIG. 3) in parallel operating section 30. In PE's 37-0, 37-1 and 37-2, arithmetics are performed between the image data supplied from VSR's 31-0, 31-1 and 31-2 and the coefficient data supplied from the corresponding coefficient memories 36-0, 36-1 and 36-2. The operation results thus obtained are unified in arithmetic element 38. In this way, the operation results of the image data constituting a local neighboring image are fetched from arithmetic element 38 in their three parts divided, unified in unifying circuit 40 during three machine cycles and output from main module 10 as output image 2.

Figure 17:
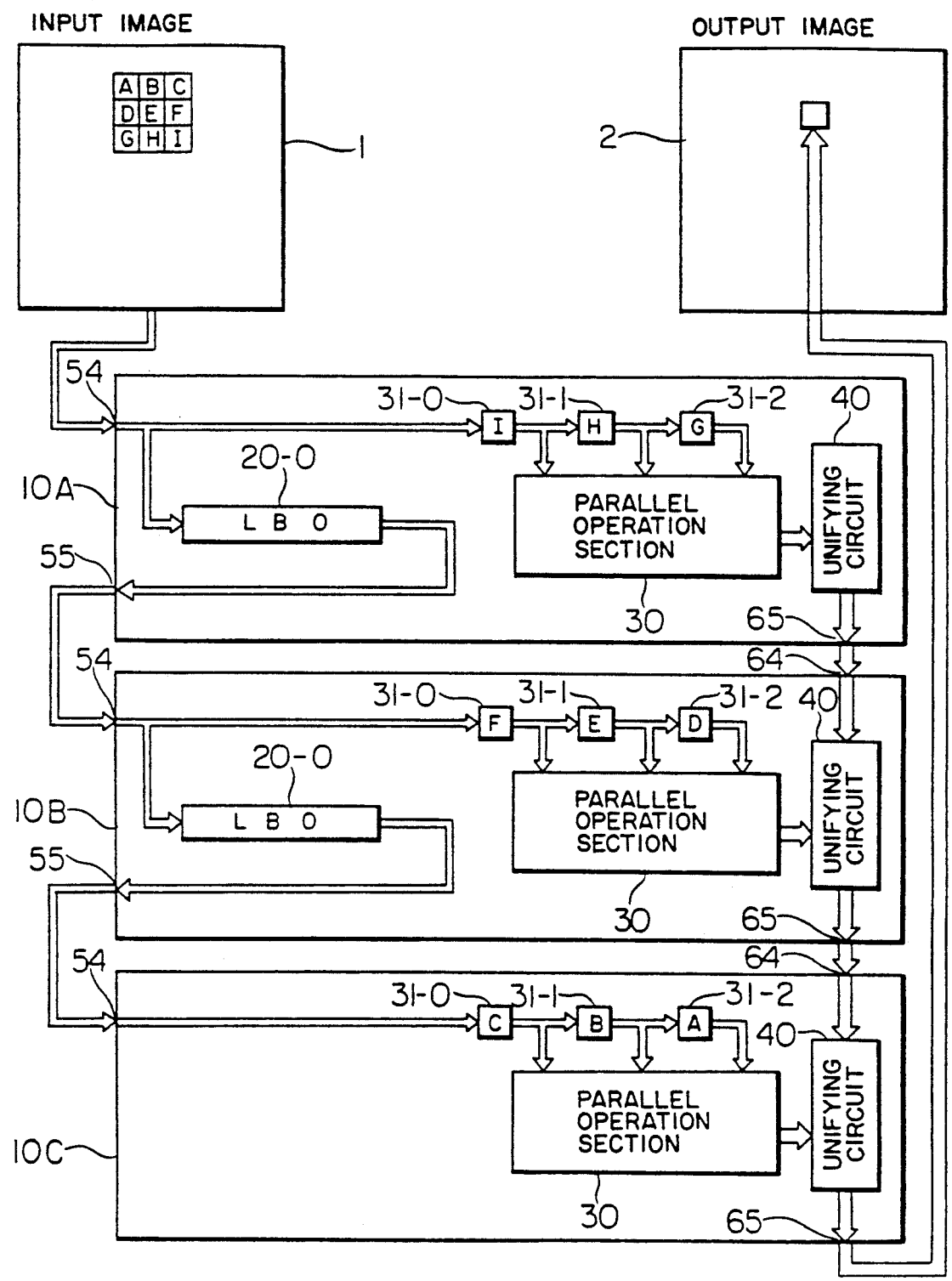

FIG. 17 shows an arrangement for performing a 3×3 local neighboring image data operation every one machine cycle using three main modules 10 one of which is shown in FIG. 1. In this arrangement, three VSR's 31 are arranged in a manner of 1×3 by switching selectors 33-0 and 33-1. And also the image data delayed from the input image data by one line of the data by line buffer 20-0 is output from image data output port 55 by switching selector 70 so that three main modules 10 are arranged in a manner of 3×1. Thus, as a whole, 3×3 local neighboring image data are simultaneously fetched. This arrangement is implemented in such a way that the control circuit 21 is externally operated so that MSKTMS and TMS are set at 0 and selectors 33-0, 33-1 and 70 can select data lines 300, 301 and 200, respectively. It should be noted that each main module 10 selects the output from line buffer 20-0 by selector 70 and outputs the data on data line 200 from image data output port 55.

Input image 1 is raster-scanned every one machine cycle. The input image data read out by the raster scanning are supplied to the image data input port 54 of a main module 10A. The image data delayed by one line of the data by line buffer 20-0 in main module 10A is output from the image data output port 55 of main module 10A, and fed to the image data input port 54 of a main module 10B. In the same manner, the image data delayed by one line of the data is delivered from main module 10B to main module 10C. The arithmetic result output from the operation data output port 55 of main module 10A is applied to the arithmetic data input port 64 of main module 10B and is unified with the operation result of parallel operation section 30 by unifying circuit 40 in main module 10B. In the same way, the operation result is delivered from main module 10B to main module 10C and is unified with the operation result of parallel processor 30 in main module 10C, and the unified data is output as an output image data every one machine cycle from the operation data output port 65.

Inside the main modules 10A, 10B and 10C, the respective image data are input in VSR 31-0, and sequentially shifted to VSR's 31-1 and 31-2. Thus, 3×3 local neighboring data A, B, C, D, E, F, G, H and I are simultaneously preserved in the total nine VSR's 31 in the three main modules 10. The arithmetics thereof are performed by the total three parallel processor sections 30 during one machine cycle.

Figure 18:
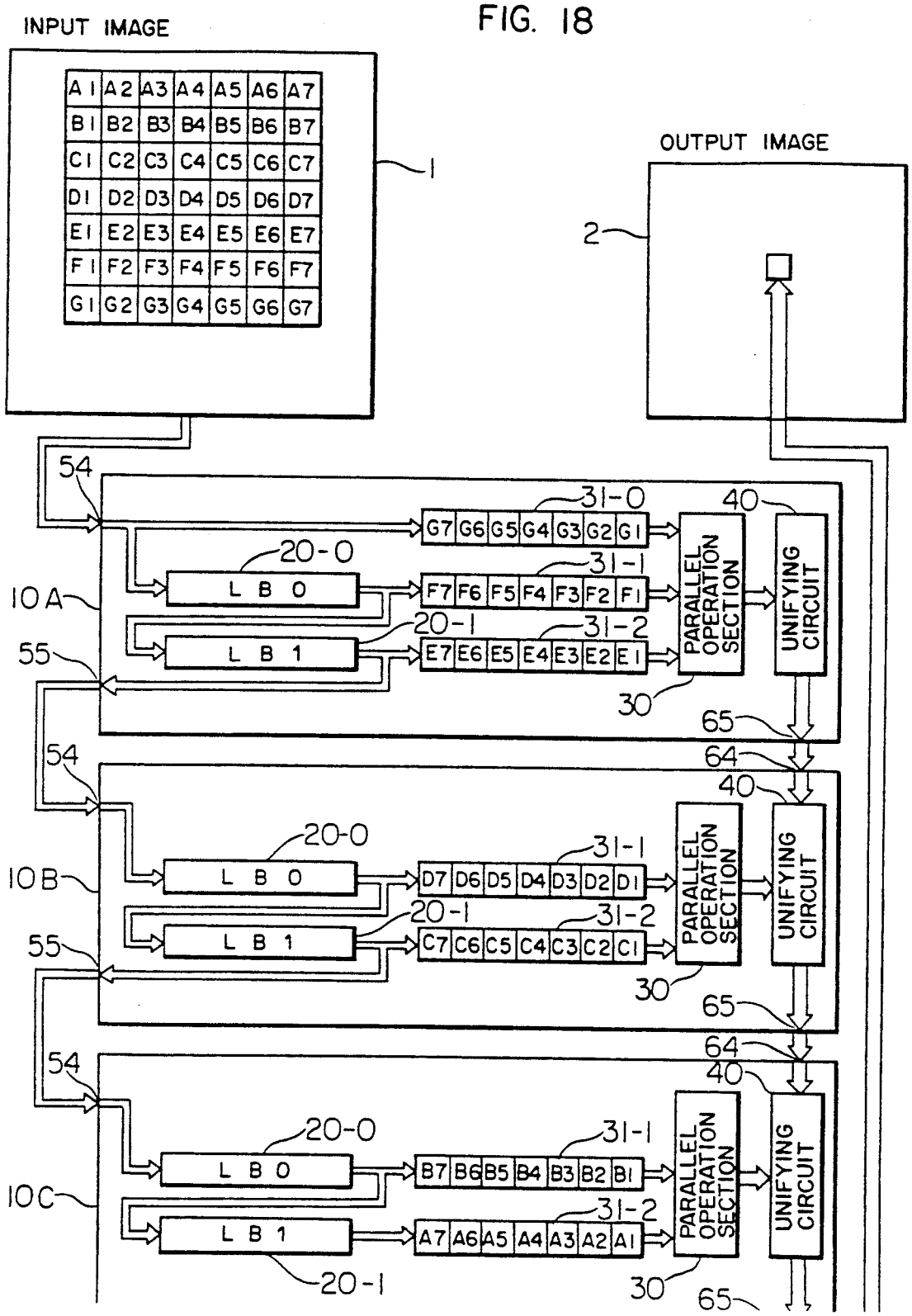

FIG. 18 shows an arrangement for performing a 7×7 local neighboring operation every seven machine cycles using three main modules connected in the same way as in FIG. 17. In this arrangement, each of VSR's 31-0, 31-2 preserves 1×7 local neighboring image data in seven time division processings, and these three VSR's are arranged in a manner of 3×1 by switching selectors 33-0 and 33-1. Thus, 3×7 local neighboring data are preserved in these VSR's for one main module. The image data delayed from the input image data by two lines of the data is output from image data output port 55 by switching the selector 70 so that these three main modules 10 are arranged in a manner of 3×1. However, the size of the local neighboring image data to be fetched is not 9×7 but 7×7. This is because one line of the image data is repeated in the adjacent main modules. The repetitions can be obviated by providing three line buffers 20 in one main module 10.

This arrangement is implemented in such a way that the control circuit 21 is externally operated so that MSKTMS and TMS are set at 6 and selectors 33-0, 33-1 and 70 can select data lines 200, 201 and 201, respectively. It should be noted that each main module 10 selects the output from line buffer 20-1 by selector 70 and outputs the data on data line 201 from image data output port 55.

Input image 1 is raster-scanned once in seven machine cycles and is fed to the image data input port 54 of main module one pixel during every seven machine cycles. The image data delayed from the input image by two lines of the data by line buffers 20-0 and 20-1 in main module 10A is output from image data output port 55 thereof and fed to the image data input port 54 of main module 10B. In the same way, the image data delayed by further two lines of the data is delivered from main module 10B to main module 10C. The operation result output from the operation data output port 65 of main module 10A is fed to the operation data input port 64 of main module 10B and unified with the operation result of the parallel processing section 30 by unifying circuit 40 inside main module 10B. In the same way, the operation result is delivered from main module 10B to main module 10C and unified with the operation result of the parallel processing unit 30 in main module 10C, and the unified data is output from operation data output port 65 as an output image data every seven machine cycles.

Inside main module 10A, 3×7 local neighboring image data are preserved in VSR's 31-0, 31-1 and 31-2 thereof. Inside main modules 10B and 10C, 2×7 (but not 3×7) local image data are preserved as effective image data in VSR's 31-1 and 31-2 thereof, respectively, during seven machine cycles since the image data preserved in the respective VSR's 31-0 are the same as the image data preserved in VSR's 31-2 of the respective previous step main modules. Thus, 7×7 local neighboring image data are preserved during the seven machine cycles in the total seven VSR's 31 in the three main modules 10A, 10B and 10C. The 7×7 local neighboring image data are read out during the seven machine cycles in a time division manner, and operated by the total three parallel processing sections 30 every seven machine cycles.

Incidentally, by setting MSKTMS and TMS at 4 in the above arrangement, the arithmetic of 5×5 local neighboring image data can be performed every five machine cycles. In this case, it should be noted that the selection of the outputs from the line buffers 20 by the selector 70 in each main module 10 is controlled by control circuit 21.

Accordingly, in accordance with this embodiment of this invention as mentioned above, the arithmetic of 3×3 local neighboring image data can be performed using one main module 10 every three machine cycles. And also, three kinds of arithmetic of 3×3, 5×5 and 7×7 local neighboring image data can be performed using three main modules 10, without changing the manner of connecting them through the operation of control circuit 21.

Figure 19:
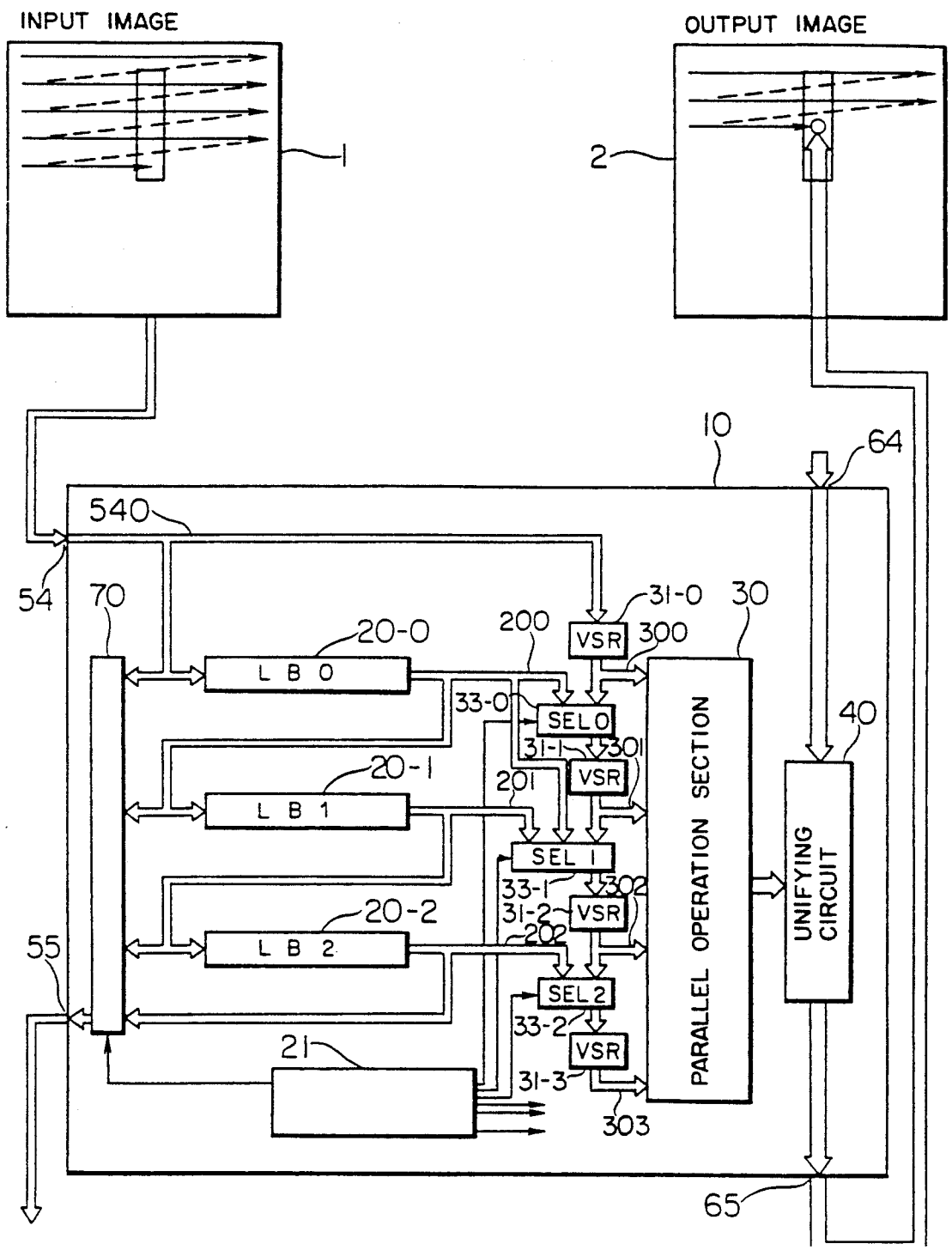
FIG. 19 is a block diagram showing an arrangement of the main module used in the parallel image processor according to another embodiment of this invention.

FIG. 19 shows another arrangement of the main module of the parallel image processor according to this invention. In the main module shown in FIG. 19, four VSR's 31, four arithmetic circuits (PE) inside parallel processing unit 30, three selectors 33 and three line buffers 20 are used, i.e. one more element than in the main module 10 shown in FIG. 1 is used for these components. The selector 33-1 is a selector of 3- to -1 which selects one of three data lines 200, 201 and 301, and so the arrangement of VSR 31 can be changed in three manners of 1×4, 2×2 and 4×1 by switching the selector 33-1. The selector 70 is a selector of 4- to -1 which selects one of four data lines 540, 200, 201 and 202, and so by switching the selector 70, one of the image data delayed from the input image data by zero, one, two, and three lines can be selected and output from image data output port 55.

Figure 20:
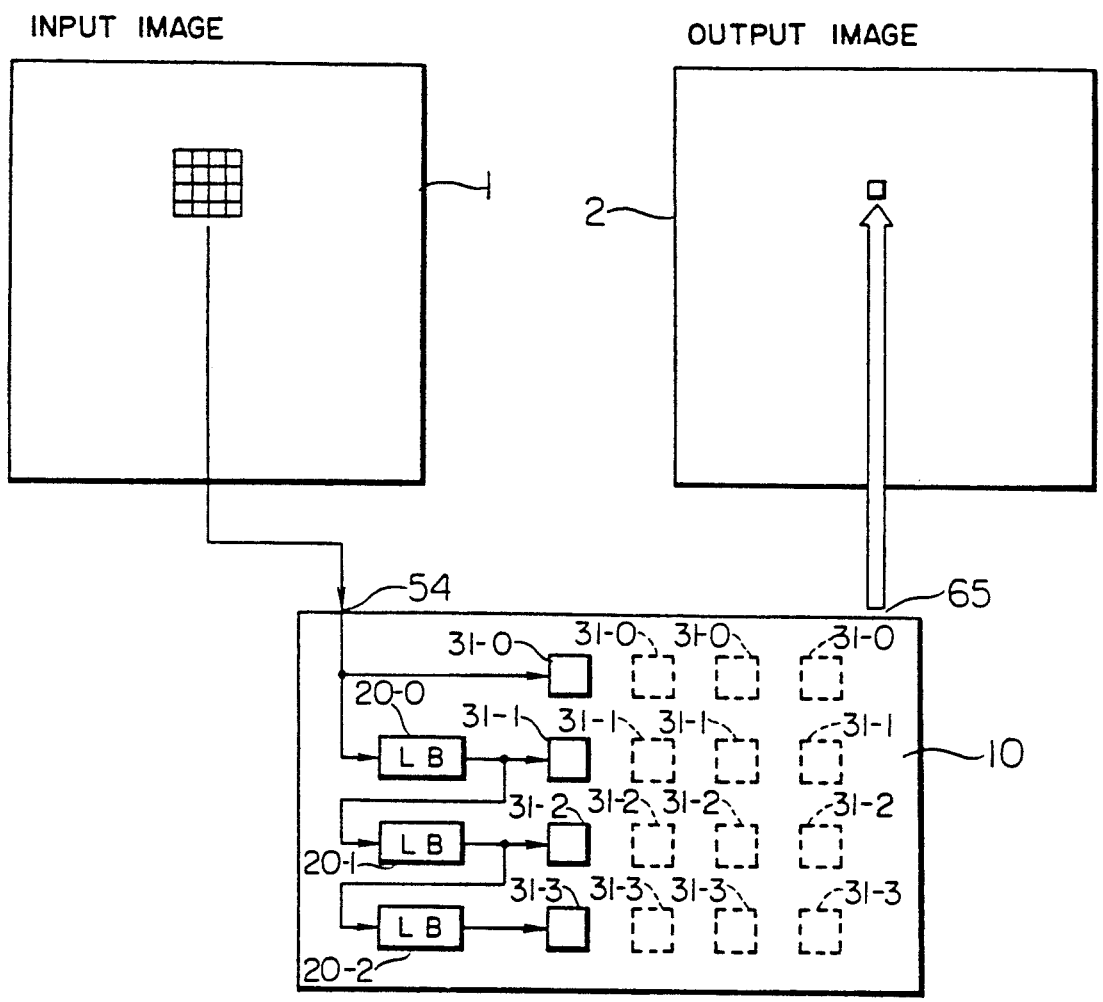
FIGS. 20 to 22 are block diagrams showing examples of the application of the main module, respectively.

FIG. 20 shows an arrangement for performing a 4×4 local neighboring image data operation every four machine cycles in a time division manner using one main module 10 shown in FIG. 19. In this arrangement, the circuits other than line buffers 20 and VSR's 31 are omitted for brevity's sake. And also in this arrangement, one VSR 31 preserves 1×4 local neighboring image data in four time division processings, and four VSR's 31 are arranged in a manner of 4×1 by switching selectors 33. Thus, as a whole, 4×4 local neighboring image data are preserved in these VSR's. This arrangement is implemented in such a way that the control circuit 21 is externally operated so that MSKTMS and TMS are set at 2 and selectors 33-0, 33-1 and 33-2 can select data lines 200, 201 and 202, respectively.

Figure 21:
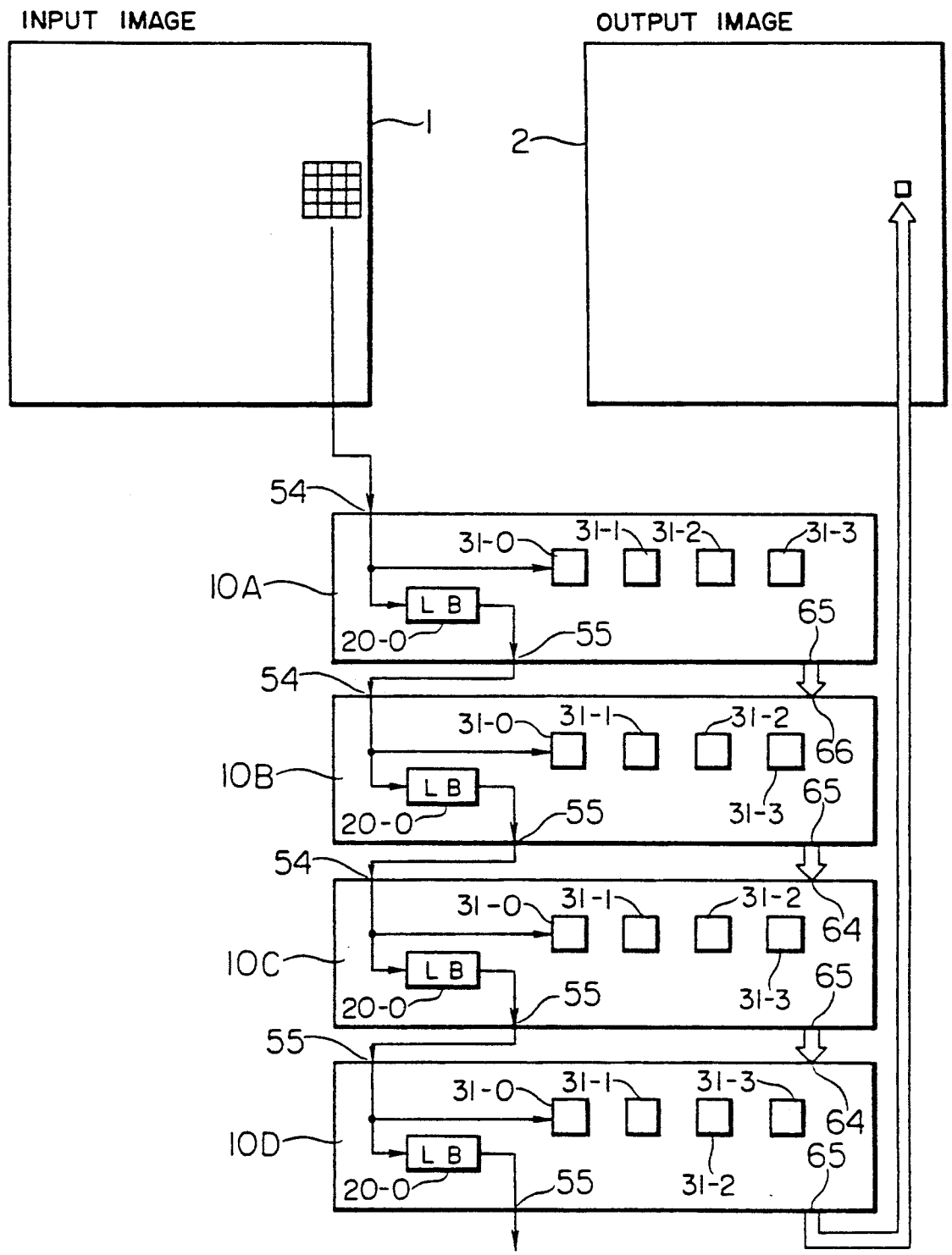

FIG. 21 shows an arrangement for performing a 4×4 local neighboring image data operation every one machine cycle using four main modules one of which is shown in FIG. 19. In this arrangement, four VSR's 31 are arranged in a manner of 1×4 by the switching selectors 33 shown in FIG. 19. And also in each module the image data delayed from the input image data by one line of the data is output from the image data output port by switching the selector 70 so that four modules 10 are arranged in a manner of 4×1. Thus, as a whole, 4×4 local neighboring image data can be simultaneously fetched. This arrangement is implemented in such a way that the control circuit 21 is externally operated so that MSKTMS and TMS are set at 0 and selectors 33-0, 33-1, 33-2 and 70 can select data lines 300, 301, 302 and 200, respectively. It should be noted that selector 70 in FIG. 19 serves to select line buffer 20-0 and output the data on data line 200 from image data output port 55.

In the arrangement of FIG. 21, an input image data is applied to the image data input port 54 of the main module 10A. The image data delayed from the input image data by one line of the data is output from image data output port 55 of main module 10A and applied to image data input port 54 of main module 10B. In the same way, the image data is delivered from main module 10B to main module 10C and from main module 10C to main module 10D. Moreover, the operation result output from operation data output port 65 of main module 10A is applied to the operation data input port 64 of main module 10B. In the same way, the operation result is delivered from main module 10B to main module 10C and from main module 10C to main module 10D. Finally, an output image data is output from the operation data output port 65 of main module 10D every one machine cycle.

Figure 22:
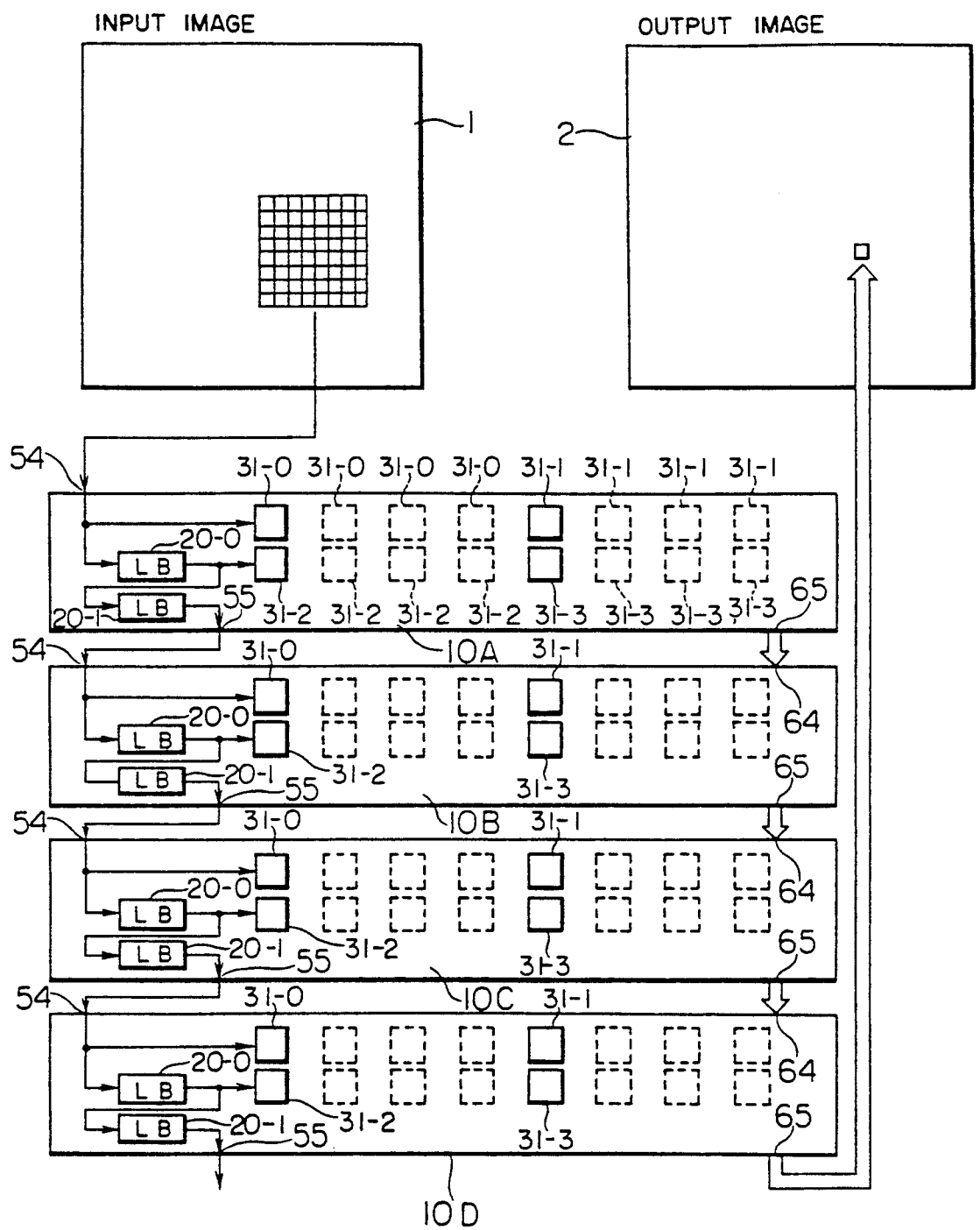

FIG. 22 shows an arrangement for performing an 8×8 local neighboring image data operation every four machine cycles using four main modules 10 connected in the same manner as in FIG. 21. In this arrangement, each VSR preserves 1×4 local neighboring data in four time division processings, and these four VSR's 31 are arranged in a manner of 2×2 by switching selectors 33 in FIG. 19. Thus, 2×8 local neighboring data are preserved for one main module. The image data delayed from the input image data by two lines of the data is output from image data output port 55 by switching the selector 70 so that these four main modules 10 are arranged in a manner of 4×1. As a whole, 8×8 local neighboring image data are preserved in this arrangement. This arrangement is implemented in such a way that the control circuit 21 is externally operated so that MSKTMS and TMS are set at 3 and selectors 33-0, 33-1, 33-2 and 70 can select data lines 300, 200, 302 and 201, respectively. It should be noted that the main module 10 in FIG. 19 selects the output from line buffer 20-1 by means of selector 70 and outputs the data on data line 201 through image data output port 55.

In the arrangement of FIG. 22, input image 1 is raster-scanned once in four machine cycles and is fed to the image data input port 54 of main module 10A one pixel during every four machine cycles. The image data delayed from the input image by two lines of the data by line buffers 20-0 and 20-1 in main module 10A is output from image data output port 55 thereof and fed to the image data input port 54 of main module 10B. In the same way, the image data delayed by further two lines of the data is delivered from main module 10B to main module 10C, moreover from main module 10C to main module 10D. The operation result is delivered from main module 10D as an output image data every four machine cycles.

In accordance with this embodiment of this invention as mentioned above, the arithmetic of 4×4 local neighboring image data can be performed using one main, module 10 every four machine cycles. And also, several kinds of arithmetic of local neighboring image data, 4×4, 8×8, etc. can be performed using plural main modules 10, without changing the manner of connecting them through the external operation of control circuit 21.

Figure 23:
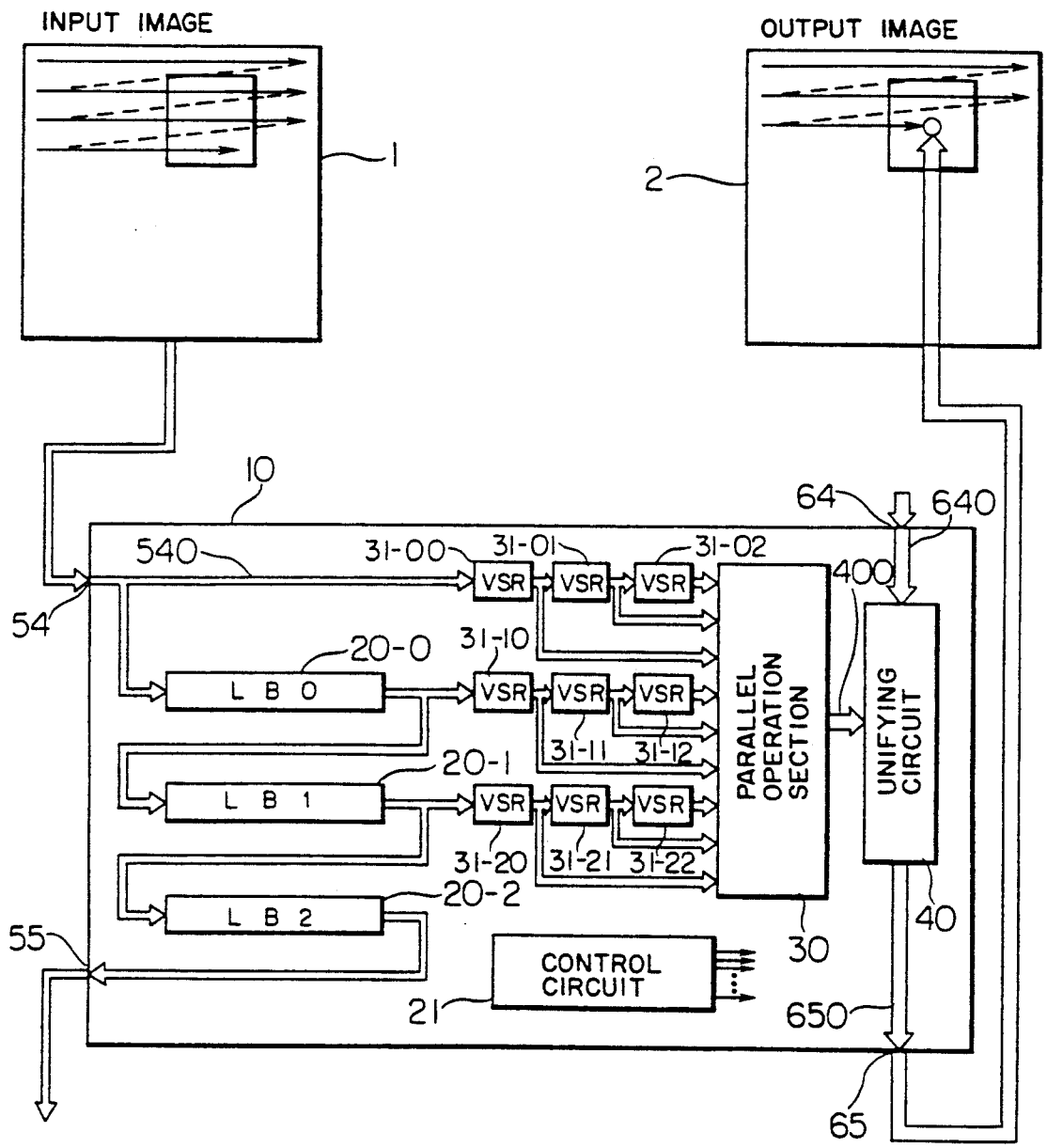
FIG. 23 is a block diagram showing an arrangement of the main module used in the parallel image processor according to still another embodiment of this invention.

FIG. 23 shows still another arrangement of the main module 10 of the parallel image processor, which includes three line buffers 20, nine VSR's and also nine processor elements (PE) 37 in parallel processor section 30.

Figure 24:
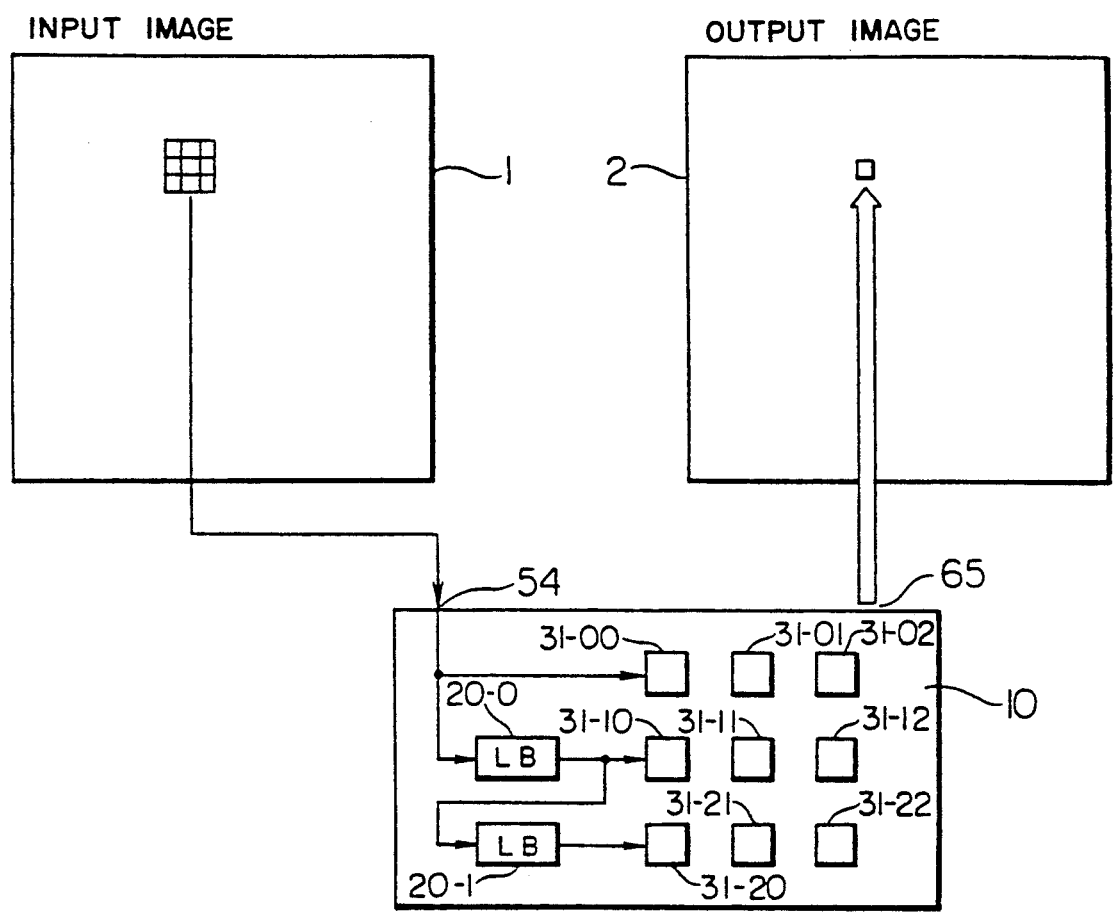
FIGS. 24 to 27 are block diagrams showing examples of the application of the main module, respectively.
Figure 25:
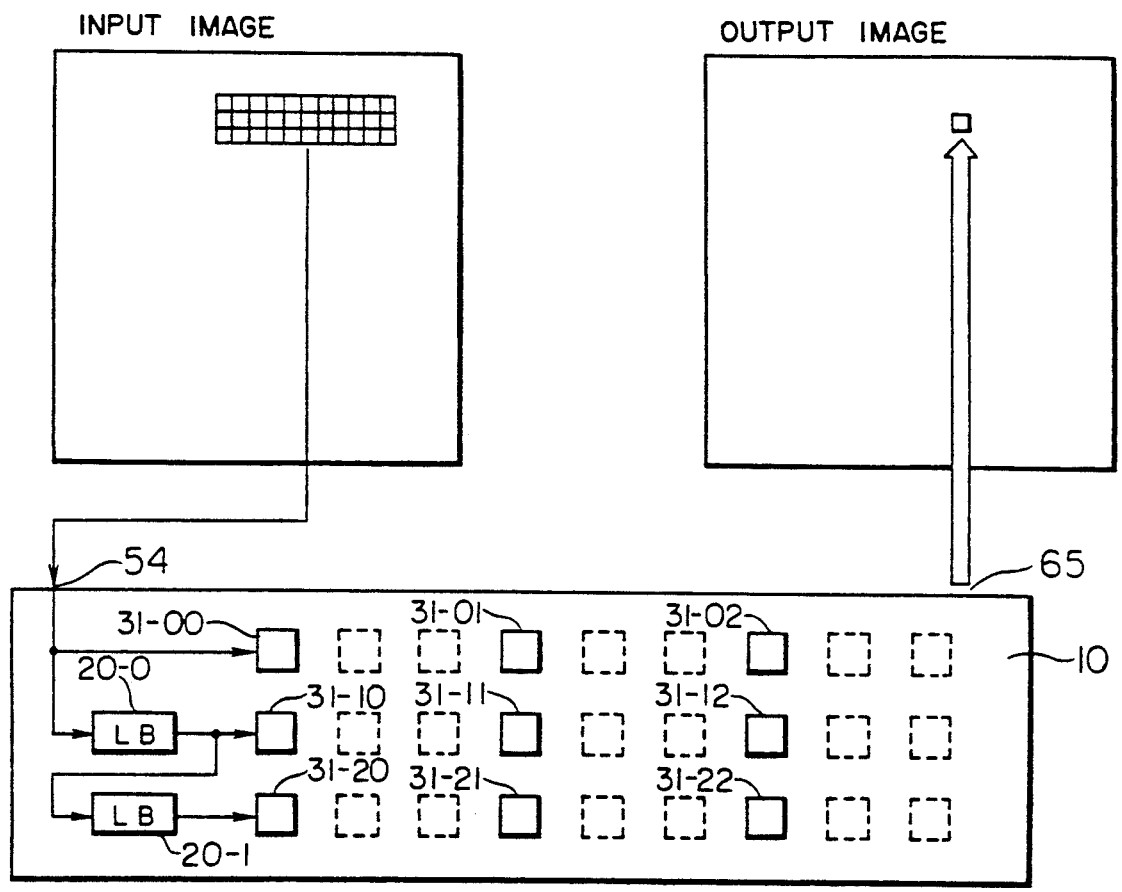

FIG. 24 shows an arrangement for performing a 3×3 local neighboring image data operation every one machine cycle using one main module 10. FIG. 25 shows an arrangement for performing a 3×9 local neighboring image data operation every three machine cycles in a time division manner by means of the same hardware as in FIG. 24.

Figure 26:
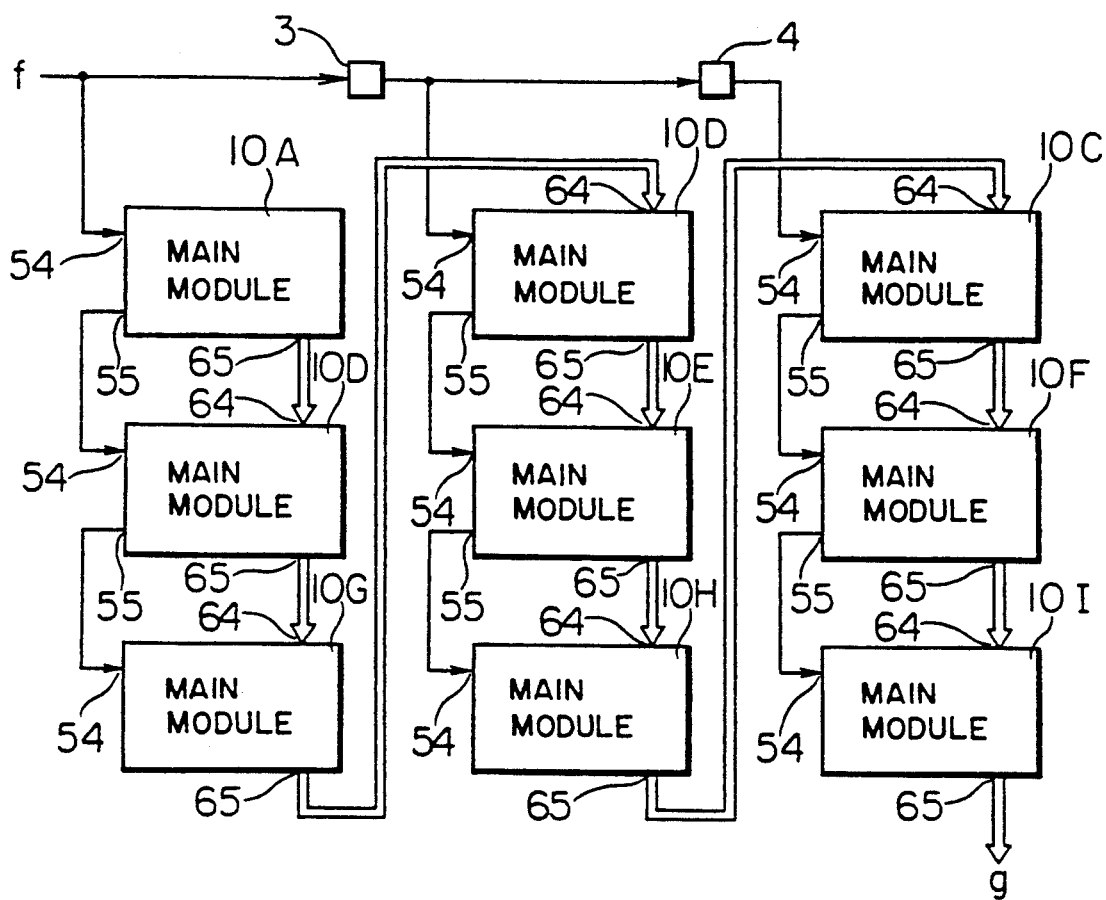

FIG. 26 shows an arrangement for performing a 9×9 local neighboring image data operation every one machine cycle using nine main modules 10.

An image data f is applied to the image data input 54 of main module 10A. It is also delayed by three pixels by a shift register 3 and applied to the image data input port 54 of main module 10B. The delayed image data is further delayed by three pixels by a shift register 4 and applied to the image data input port 54 of main module 10C. The image data delayed from the input image data f by three lines of the data, output from the respective image data output ports 55 of main modules 10A, 10B and 10C, are applied to the image data input port 54 of main modules 10D, 10E and 10F, respectively. The image data delayed from the input image data f by six lines of the data, output from the respective image data output ports 55 of main modules 10D, 10E and 10F, are applied to the image data input port 54 of main modules 10G, 10H and 10I, respectively. Further, the operation result output from the operation data output port 65 of main module 10A is applied to the operation data input port 64 of main module 10D. In the same way, the operation result is delivered from main module 10D to main module 10G, from 10G to 10B, and further to 10E, 10H, 10C, 10F and 10I. Finally, an output image data g is output from the operation data output port 65 of main module 10I every one machine cycle.

Figure 27:
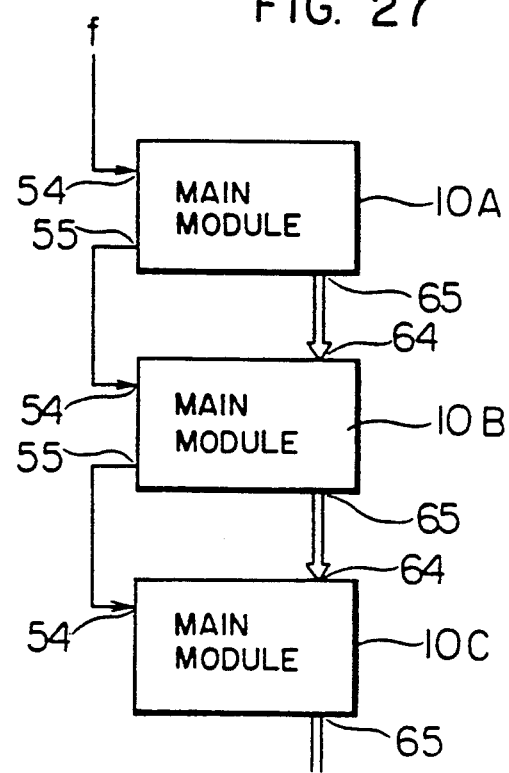

FIG. 27 shows an arrangement for performing a 9×9 local neighboring image data operation every three machine cycles in a time division manner using three main modules 10. In this arrangement, the same 9×9 local neighboring image data operation as in the arrangement of FIG. 26 can be realized by means of the amount of hardware which is ⅓ of that of the latter.

In accordance with this embodiment of this invention, the arithmetic of 3×3 local neighboring image data can be performed using one main module 10 every one machine cycle. And also, by using plural main modules 10, the arithmetic employing a larger local image region, e.g. zero-crossing operation, pattern matching, etc. can be performed every one machine cycle. Further, the arithmetic employing a larger local image region can be performed by a smaller amount of hardware in a time division processing.

Thus, several embodiments of this invention have been explained above. It should be noted in each embodiment that the respective numbers of line buffers 20, VSR's 31, and processor elements (PE) 37 in parallel processor section 30 can be determined as required in relation to the degree of integration of LSI. If with m or m-1 line buffers and m arithmetic circuits being provided in the main module, such a single main module is used for the time division processing in n cycles, the processing of m×n local neighboring image data can be performed in m machine cycle. Or if above-mentioned n main modules are arranged for the parallel processing of the respective line buffer outputs selected by selector 70 one for each main module, the processing of n×m local neighboring image data can be performed in one machine cycle.

Further, only if selectors 70 and 31 are switched with the n main modules provided, the time division processing of (m×n) rows×t columns can be performed at the maximum (In this case, t machine cycles and an arrangement of VSR's of t steps are required).

A wider varieties of parallel processings can be performed at a high speed by providing m×n arithmetic circuits 37.

Thus, the parallel image processor according to this invention can be flexibly adapted to the needs of users; where a large amount of image data is desired to be processed at a high speed or where a small amount of hardware is desired although more time is necessary.

(1) In accordance with this invention, the local neighboring image region to be subjected to a local neighboring image data processing can be easily expanded without the needs of externally equipped circuits and complicated controls.

(2) In accordance with this invention, the local neighboring image operations for various local neighboring image regions can be realized by altering the construction of each of main modules through the operation of a control circuit provided therein and without altering the connecting manner of the main modules.

(3) In accordance with this invention, the amount of hardware used can be greatly reduced by LSI'ing each main module.

We claim:

1. A parallel image processor having at least one main module for performing a parallel operation of local neighboring image data on the basis of input image data externally taken in, comprising:
    at least one buffer for delaying the input image data by one line of the data in order;
    at least one sequential memory means for storing local neighboring image data sequentially cut out from the input image data;
    a parallel operation unit for performing a parallel operation of the local image data stored in the sequential memory means;
    unifying means for unifying the results of the parallel operation and outputting the unified result;
    an output port for fetching the delayed image data and feeding it to another main module as input image data for connected between the main modules;
    a first selector for selectively switching the input image data and the delayed image data of each line buffer to the output port; and
    second selectors for selectively switching the output from a line buffer and the output from a sequential memory means and supplying them to a succeeding sequential memory means;
    wherein said main module performs a parallel operation of m×n (m, n: integer) local neighboring image data cut out from said input data, at least m-1 line buffers are provided for delaying said input image data in order by one line of the data, said sequential memory means consists of m×n steps, for storing the local neighboring image data sequentially cut out from the input image data or the delay image data, said parallel operation unit includes m processor elements for performing the parallel operation of the local neighboring image data, and said unifying means unifies the results of the parallel operation in n machine cycles and outputs the unified result.

2. The image processor as claimed in claim 1, wherein said parallel operation section comprises m coefficient memories for storing coefficient data corresponding to the processor elements, respectively.

3. A parallel image processor having at least one main module for performing a parallel operation of local neighboring image data on the basis of input image data externally taken in, comprising:
    at least one buffer for delaying the input image data by one line of the data in order;
    at least one sequential memory means for storing local neighboring image data sequentially cut out from the input image data;
    a parallel operation unit for performing a parallel operation of the local image data stored in the sequential memory means;
    unifying means for unifying the results of the parallel operation and outputting the unified result;
    an output port for fetching the delayed image data and feeding it to another main module as input image data for connected between the main modules;
    a first selector for selectively switching the input image data and the delayed image data of each line buffer to the output port; and
    second selectors for selectively switching the output from a line buffer and the output from a sequential memory means and supplying them to a succeeding sequential memory means; and
    an input port for taking in said input image data, at least m-1 line buffers for delaying the input image data in order by one line of the data, m sequential memory means having a variable number of steps, for storing the local neighboring image data sequentially cut out from the input image data or the delayed image data, and a control circuit for supplying control signals to said first and second selectors, wherein m-1 second selectors are provided for selectively switching the outputs from the line buffers and the outputs from the sequential memory means supplying them to succeeding sequential memory means, and wherein said parallel operation section comprises m processor elements for performing the parallel operation of the local neighboring image data output from the corresponding sequential memory means.

4. The image processor as claimed in claim 3, wherein said parallel operation section comprises m coefficient memories for storing coefficient data corresponding to the processor elements, respectively, and the local neighboring image data cut out from the sequential memory means and the coefficient data are operated in parallel in the corresponding processor elements.

5. The image processor as claimed in claim 3, wherein said sequential memory means intermittently performs a shift operation for clock signals and reads out the memory content at each clock signal.

6. The image processor as claimed in claim 3, wherein said line buffers comprise information memory sections permitting at least one bit to be simultaneously read out and written in, and a row address control section for controlling the row addresses of said information memory sections, the read-out, write-in starting and ending row addresses of said information memory sections being determined in accordance with the control signals supplied to the row address control section so as to make the number of delay steps variable.

7. The image processor as claimed in claim 3, further comprising an operation data input port for taking in an externally provided operation result which is unified with the operation result obtained from the parallel operation section in said unifying means, and an operation data output port for externally outputting the unified result.

8. The image processor as claimed in claim 3, wherein each of said sequential memory means in said main module is constructed by n steps, and second selectors are switched to the outputs from the line buffers, so that m×n local neighboring image data are processed in a time division manner in n machine cycles.

9. The image processor as claimed in claim 3, wherein n×m local neighboring image data are processed in n main modules during one machine cycle in such a state that the image data output port is connected with the input port of the respective main module to provide said sequential memory means each having one step, the first selector being switched to the output of the line buffer delayed by one line of the data, and the second selectors being switched to the outputs of the sequential memory means.

10. The image processor as claimed in claim 3, wherein m×n×t local image neighboring image data are processed in n main modules in a time division manner in t machine cycles in such a state that the image data output port is connected with the input port of the respective succeeding main module to provide said sequential memory means each having t steps, the first selector being switched to one of the outputs of the line buffers, and the second selectors being switched to the outputs of the line buffers.

* * * * *